(12) United States Patent
Uchida et al.

(10) Patent No.: US 7,681,030 B2
(45) Date of Patent: Mar. 16, 2010

(54) MOBILE COMMUNICATION TERMINAL, INFORMATION PROCESSING METHOD, DATA PROCESSING PROGRAM, AND RECORDING MEDIUM

(75) Inventors: Motoyuki Uchida, Kanagawa (JP); Tadao Takami, Kanagawa (JP); Yasutaka Urakawa, Kanagawa (JP); Takashi Kadohiro, Kanagawa (JP); Hiroaki Tomoda, Kanagawa (JP); Seiji Hoshi, Kanagawa (JP); Makoto Ito, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 862 days.

(21) Appl. No.: 10/482,169

(22) PCT Filed: Feb. 7, 2003

(86) PCT No.: PCT/JP03/01299

§ 371 (c)(1),
(2), (4) Date: Jan. 8, 2004

(87) PCT Pub. No.: WO03/067811

PCT Pub. Date: Aug. 14, 2003

(65) Prior Publication Data

US 2004/0171399 A1 Sep. 2, 2004

(30) Foreign Application Priority Data

Feb. 8, 2002 (JP) .............................. 2002-032947

(51) Int. Cl.
*H04L 9/14* (2006.01)
(52) U.S. Cl. ...................... 713/150; 713/176; 380/270; 380/277

(58) Field of Classification Search ................. 713/150, 713/168, 189, 176; 380/255, 270, 277; 705/55, 705/58; 726/3, 26; 455/410, 411
See application file for complete search history.

(56) References Cited

U.S. PATENT DOCUMENTS

| | | | | |
|---|---|---|---|---|
| 5,321,754 A * | 6/1994 | Fisher et al. | ................. | 380/268 |
| 5,375,169 A * | 12/1994 | Seheidt et al. | ............... | 713/171 |
| 5,751,805 A * | 5/1998 | Otsuki et al. | .................. | 705/54 |
| 6,009,174 A * | 12/1999 | Tatebayashi et al. | ........ | 380/277 |
| 6,009,553 A * | 12/1999 | Martinez et al. | ............ | 714/784 |
| 6,084,969 A * | 7/2000 | Wright et al. | ............... | 380/271 |
| 6,085,323 A * | 7/2000 | Shimizu et al. | ............. | 713/150 |
| 6,687,375 B1 * | 2/2004 | Matyas et al. | ................. | 380/45 |

(Continued)

FOREIGN PATENT DOCUMENTS

EP      0725512      8/1996

(Continued)

*Primary Examiner*—Edan Orgad
*Assistant Examiner*—Yin-Chen Shaw
(74) *Attorney, Agent, or Firm*—Oblon, Spivak, McClelland, Maier & Neustadt, L.L.P.

(57) ABSTRACT

A transmitter cell phone 10 is provided with a controller 11 for fulfilling functions of a data encryptor, a first key encryptor, and an encryption file generator. The data encryptor encrypts data, using a first encryption key. The first key encryptor encrypts the first encryption key, using a second encryption key. The encryption file generator generates an encryption file of the data from the data encrypted by the data encryptor, the first encryption key encrypted by the first key encryptor, and user-specific information permitting identification of a user of the mobile communication terminal.

4 Claims, 14 Drawing Sheets

U.S. PATENT DOCUMENTS

| | | | |
|---|---|---|---|
| 6,799,273 B1* | 9/2004 | Oishi et al. | 713/171 |
| 6,892,301 B1* | 5/2005 | Hansmann et al. | 713/172 |
| 6,950,541 B1* | 9/2005 | Setlak et al. | 382/126 |
| 6,981,141 B1* | 12/2005 | Mahne et al. | 713/165 |
| 6,999,948 B1* | 2/2006 | Hatanaka et al. | 705/65 |
| 7,073,063 B2* | 7/2006 | Peinado | 713/171 |
| 7,373,517 B1* | 5/2008 | Riggins | 713/184 |
| 2001/0056541 A1* | 12/2001 | Matsuzaki et al. | 713/193 |
| 2002/0025042 A1* | 2/2002 | Saito | 380/258 |
| 2002/0077988 A1* | 6/2002 | Sasaki et al. | 705/59 |
| 2002/0128037 A1* | 9/2002 | Schmidt | 455/553 |
| 2002/0148343 A1* | 10/2002 | Gross | 84/609 |
| 2003/0126435 A1* | 7/2003 | Mizell et al. | 713/168 |
| 2005/0004875 A1* | 1/2005 | Kontio et al. | 705/52 |
| 2005/0076208 A1* | 4/2005 | Hori et al. | 713/165 |

FOREIGN PATENT DOCUMENTS

| | | |
|---|---|---|
| EP | 1 022 638 A2 | 7/2000 |
| JP | 1-212041 | 8/1989 |
| JP | 10-210026 | 8/1998 |
| JP | 2000-206876 | 7/2000 |
| WO | WO 00/17731 | 3/2000 |

* cited by examiner

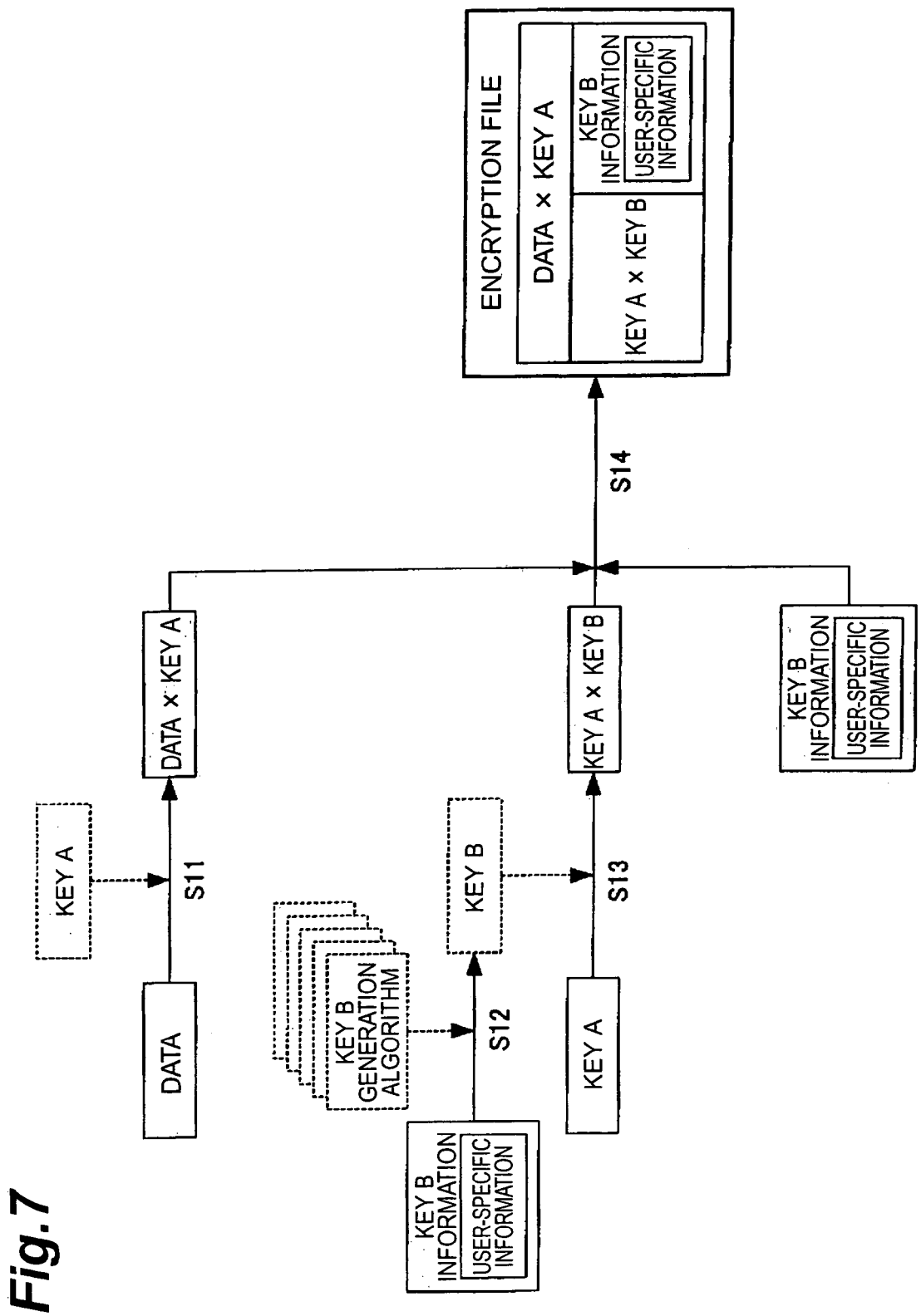

US 7,681,030 B2

MOBILE COMMUNICATION TERMINAL, INFORMATION PROCESSING METHOD, DATA PROCESSING PROGRAM, AND RECORDING MEDIUM

TECHNICAL FIELD

The present invention relates to a mobile communication terminal, an information processing method, a data processing program, and a recording medium.

BACKGROUND ART

In recent years, the development of information communication technologies promoted transmission and reception of data of documents, pictures, etc. through networks such as the Internet. Particularly, in the case of communication terminals such as cell phones, where a user switches a model to another or where a user selectively uses a plurality of communication terminals, data such as information about the user, a telephone directory, etc. is transferred to another communication terminal, for example, upon replacement of UIM (User Identity Module). During the transfer of data, conversion (encryption) of the data according to a predetermined rule is an effective means for preventing unauthorized access to the data or falsification of the data by a third party in the middle of communication.

DISCLOSURE OF THE INVENTION

However, the conventional techniques as described above had the following problem. Namely, encryption key data (hereinafter referred to as "encryption key") is used in encryption of the data, but it is also presumable that the encryption of data by the encryption key is not always effective in preventing such irregularities as the unauthorized access to or falsification of data by a third party, because of sophistication of data analysis technologies.

The present invention has been accomplished in view of the above problem and an object of the invention is to provide a mobile communication terminal, an information processing method, a data processing program, and a recording medium capable of making the analysis of encrypted data difficult and thus securing high confidentiality for data.

In order to achieve the above object, a mobile communication terminal according to the present invention comprises: data encrypting means for encrypting data (which encompasses a file and/or a program and which can be single data or multiple data) stored in the mobile communication terminal, using a first encryption key; first key encrypting means for encrypting the first encryption key, using a second encryption key; and encryption file generating means for generating an encryption file of the data from the data encrypted by the data encrypting means, the first encryption key encrypted by the first key encrypting means, and user-specific information permitting identification of a user of the mobile communication terminal, for generation of the second encryption key.

In order to achieve the above object, an information processing method according to the present invention is an information processing method for a mobile communication terminal to process data, the information processing method comprising: a data encryption step of encrypting data, using a first encryption key; a first key encryption step of encrypting the first encryption key, using a second encryption key; and an encryption file generation step of generating an encryption file of the data from the data encrypted in the data encryption step, the first encryption key encrypted in the first key encryption step, and user-specific information permitting identification of a user of the mobile communication terminal, for generation of the second encryption key.

In order to achieve the above object, a data processing program according to the present invention is a data processing program for letting a computer fulfill: a data encryption function of encrypting data, using a first encryption key; a first key encryption function of encrypting the first encryption key, using a second encryption key; and an encryption file generation function of generating an encryption file of the data from the data encrypted by the data encryption function, the first encryption key encrypted by the first key encryption function, and user-specific information permitting identification of a user of a mobile communication terminal, for generation of the second encryption key.

According to these aspects of the invention, the encryption file of the data is generated from the data encrypted using the first encryption key, the first encryption key encrypted using the second encryption key, and the user-specific information for generation of the second encryption key. Namely, the encryption file is generated through double encryption processes, so that the analysis of the data is made more difficult than that of encryption files encrypted using a non-encrypted encryption key. This can prevent such irregularities as the unauthorized access to or falsification of the data by a third party in advance. As a result, high confidentiality can be secured for the data. Since the generated encryption file contains the user-specific information permitting identification of the user of the mobile communication terminal, it is at low risk of being decrypted by mobile communication terminals of other users.

In order to achieve the above object, another potential mobile communication terminal according to the present invention comprises data encrypting means for encrypting data, using a first encryption key; first falsification check data generating means for generating first falsification check data for a falsification check on the encrypted data; additional information encrypting means for encrypting additional information containing the first falsification check data generated by the first falsification check data generating means, using a second encryption key; and encryption file generating means for generating an encryption file of the data from the data encrypted by the data encrypting means, the additional information encrypted by the additional information encrypting means, and second encryption key information containing user-specific information permitting identification of a user of the mobile communication terminal.

In order to achieve the above object, another potential information processing method according to the present invention is an information processing method for a mobile communication terminal to process data, the information processing method comprising: a data encryption step of encrypting data, using a first encryption key; a first falsification check data generation step of generating first falsification check data for a falsification check on the encrypted data; an additional information encryption step of encrypting additional information containing the first falsification check data generated in the first falsification check data generation step, using a second encryption key; and an encryption file generation step of generating an encryption file of the data from the data encrypted in the data encryption step, the additional information encrypted in the additional information encryption step, and second encryption key information containing user-specific information permitting identification of a user of the mobile communication terminal.

In order to achieve the above object, another potential data processing program according to the present invention is a data processing program for letting a computer fulfill: a data encryption function of encrypting data, using a first encryption key; a first falsification check data generation function of generating first falsification check data for a falsification check on the encrypted data; an additional information encryption function of encrypting additional information containing the first falsification check data generated by the first falsification check data generation function, using a second encryption key; and an encryption file generation function of generating an encryption file of the data from the data encrypted by the data encryption function, the additional information encrypted by the additional information encryption function, and second encryption key information containing user-specific information permitting identification of a user of a mobile communication terminal.

According to these aspects of the invention, the encryption file of the data is generated from the data encrypted using the first encryption key, the additional information containing the first falsification check data for a falsification check on the encrypted data, and the user-specific information. Namely, the generated encryption file contains both the encrypted data and the data encrypted after having been converted for the falsification check, which makes the analysis of the data difficult. This can prevent the irregularities such as the unauthorized access to or falsification of the data by a third party. As a result, high confidentiality can be secured for the data. Since the generated encryption file contains the user-specific information permitting identification of the user of the mobile communication terminal, it is at low risk of being decrypted by mobile communication terminals of other users.

Preferably, the mobile communication terminal according to the present invention further comprises second key generating means for generating the second encryption key, using the second encryption key information.

Preferably, the information processing method according to the present invention further comprises a second key generation step wherein the mobile communication terminal generates the second encryption key, using the second encryption key information.

Preferably, the data processing program according to the present invention makes the computer further fulfill a second key generation function of generating the second encryption key, using the second encryption key information.

According to these aspects of the invention, the second encryption key is generated using the second encryption key information containing the user-specific information permitting the identification of the user of the mobile communication terminal. The additional information containing the falsification check data is encrypted using the second encryption key. Namely, the user-specific information is essential to decryption of the additional information. Accordingly, the encryption file is at low risk of being decrypted by mobile communication terminals of other users, as a matter of course, and the additional information is also at low risk of being decrypted by mobile communication terminals of other users. This secures much higher confidentiality for the data.

More preferably, the mobile communication terminal according to the present invention is constructed in a configuration wherein the second encryption key information contains identification information for identification of an algorithm used in generation of the second encryption key and wherein the second key generating means generates the second encryption key, using the algorithm identified by the identification information.

More preferably, the information processing method according to the present invention is configured so that the second encryption key information contains identification information for identification of an algorithm used in generation of the second encryption key and so that the second key generation step comprises a step wherein the mobile communication terminal generates the second encryption key, using the algorithm identified by the identification information.

More preferably, the data processing program according to the present invention is configured so that the second encryption key information contains identification information for identification of an algorithm used in generation of the second encryption key and so that the second key generating function is arranged to fulfill a function of generating the second encryption key, using the algorithm identified by the identification information.

According to these aspects of the invention, the second encryption key is generated using the algorithm identified by the identification information included in the second encryption key information. Namely, the mobile communication terminal properly selects the algorithm for generation of the second encryption key, according to a type of the second encryption key information. Accordingly, it becomes more difficult for a third party to specify the algorithm used in the generation of the second encryption key than in the case where the second encryption key is always generated by an identical algorithm, whereby confidentiality can be further enhanced for the data.

Further preferably, the mobile communication terminal according to the present invention is constructed in a configuration wherein the additional information contains first encryption key information necessary for generation of the first encryption key.

Further preferably, the information processing method according to the present invention is configured so that the additional information contains first encryption key information necessary for generation of the first encryption key.

Further preferably, the data processing program according to the present invention is configured so that the additional information contains first encryption key information necessary for generation of the first encryption key.

According to these aspects of the invention, the additional information encrypted using the second encryption key contains both the falsification check data and the first encryption key information necessary for generation of the first encryption key. Accordingly, it becomes more difficult to decrypt the additional information. As a result, the confidentiality is further enhanced for the data. When the combination of the encryption keys with the encryption key information is used for encryption of data, it becomes feasible to change the intensity of cipher.

The above was the description of the features about the data encryption technology by the mobile communication terminal as a data transmitter, and the following is the description of the features about the data decryption technology by the mobile communication terminal as a data receiver.

A mobile communication terminal according to the present invention is a mobile communication terminal for receiving an encryption file from the mobile communication terminal as described above, the receiving mobile communication terminal comprising: acquiring means for acquiring the data encrypted by the data encrypting means, the first encryption key encrypted by the first key encrypting means, and the user-specific information from the encryption file; first key decrypting means for decrypting the first encryption key, using the user-specific information acquired by the acquiring means; and data decrypting means for decrypting the data, using the first encryption key decrypted by the first key decrypting means.

An information processing method according to the present invention is an information processing method for a mobile communication terminal to decrypt data encrypted by the information processing method as described above, the information processing method for decryption comprising: an acquisition step of acquiring the data encrypted in the data encryption step, the first encryption key encrypted in the first key encryption step, and the user-specific information from the encryption file; a first key decryption step of decrypting the first encryption key, using the user-specific information acquired in the acquisition step; and a data decryption step of decrypting the data, using the first encryption key decrypted in the first key decryption step.

A data processing program according to the present invention is a data processing program for letting a computer having data encrypted by the functions fulfilled by the data processing program as described above, fulfill: an acquisition function of acquiring the data encrypted by the data encryption function, the first encryption key encrypted by the first key encryption function, and the user-specific information from the encryption file; a first key decryption function of decrypting the first encryption key, using the user-specific information acquired by the acquisition function; and a data decryption function of decrypting the data, using the first encryption key decrypted by the first key decryption function.

According to these aspects of the invention, the mobile communication terminal of the data receiver decrypts the encryption file of the data generated from the data encrypted using the first encryption key, the first encryption key encrypted using the second encryption key, and the user-specific information. The encryption file is one encrypted so as to make the analysis of data difficult, in order to prevent the irregularities such as the unauthorized access to or falsification of the data by a third party. Accordingly, the data can be transferred with high confidentiality from the transmitter mobile communication terminal to the receiver mobile communication terminal.

Another mobile communication terminal according to the present invention is a mobile communication terminal for receiving an encryption file from the mobile communication terminal as described above, the receiving mobile communication terminal comprising: data acquiring means for acquiring the data encrypted by the data encrypting means, the additional information encrypted by the additional information encrypting means, and the second encryption key information from the encryption file; second key generating means for generating the second encryption key, using the second encryption key information acquired by the data acquiring means; additional information decrypting means for decrypting the additional information, using the second encryption key generated by the second key generating means; first encryption key information acquiring means for acquiring the first encryption key information and the first falsification check data from the additional information decrypted by the additional information decrypting means; first key generating means for generating the first encryption key, using the first encryption key information acquired by the first encryption key information acquiring means; and data decrypting means for decrypting the data acquired by the data acquiring means, using the first encryption key generated by the first key generating means.

Another information processing method according to the present invention is an information processing method for a mobile communication terminal to decrypt data encrypted by the information processing method as described above, the information processing method for decryption comprising: a data acquisition step of acquiring the data encrypted in the data encryption step, the additional information encrypted in the additional information encryption step, and the second encryption key information from the encryption file; a second key generation step of generating the second encryption key, using the second encryption key information acquired in the data acquisition step; an additional information decryption step of decrypting the additional information, using the second encryption key generated in the second key generation step; a first encryption key information acquisition step of acquiring the first encryption key information and the first falsification check data from the additional information decrypted in the additional information decryption step; a first key generation step of generating the first encryption key, using the first encryption key information acquired in the first encryption key information acquisition step; and a data decryption step of decrypting the data acquired in the data acquisition step, using the first encryption key generated in the first key generation step.

Another data processing program according to the present invention is a data processing program for letting a computer having data encrypted by the functions fulfilled by the data processing program as described above, fulfill: a data acquisition function of acquiring the data encrypted by the data encryption function, the additional information encrypted by the additional information encryption function, and the second encryption key information from the encryption file; a second key generation function of generating the second encryption key, using the second encryption key information acquired by the data acquisition function; an additional information decryption function of decrypting the additional information, using the second encryption key generated by the second key generation function; a first encryption key information acquisition function of acquiring the first encryption key information and the first falsification check data from the additional information decrypted by the additional information decryption function; a first key generation function of generating the first encryption key, using the first encryption key information acquired by the first encryption key information acquisition function; and a data decryption function of decrypting the data acquired by the data acquisition function, using the first encryption key generated by the first key generation function.

According to these aspects of the invention, the mobile communication terminal of the data receiver decrypts the encryption file of the data generated from the data encrypted using the first encryption key, the additional information encrypted using the second encryption key, and the second encryption key information containing the user-specific information. The encryption file is one encrypted so as to make the analysis of data much more difficult, in order to prevent the irregularities such as the unauthorized access to or falsification of the data by a third party. Accordingly, the data can be transferred with much higher confidentiality from the transmitter mobile communication terminal to the receiver mobile communication terminal.

Preferably, the mobile communication terminal according to the present invention further comprises second falsification check data generating means for generating second falsification check data for a falsification check on the data decrypted by the data decrypting means; and collating means for collating the first falsification check data acquired by the first encryption key information acquiring means, with the second falsification check data generated by the second falsification check data generating means.

Preferably, the information processing method according to the present invention further comprises a second falsification check data generation step of generating second falsification check data for a falsification check on the data decrypted in the data decryption step; and a collation step of collating the first falsification check data acquired in the first encryption key information acquisition step, with the second falsification check data generated in the second falsification check data generation step.

Preferably, the data processing program according to the present invention makes the computer further fulfill a second falsification check data generation function of generating second falsification check data for a falsification check on the data decrypted by the data decryption function; and a collation function of collating the first falsification check data acquired by the first encryption key information acquisition function, with the second falsification check data generated by the second falsification check data generation function.

According to these aspects of the invention, the second falsification check data is generated for determining whether the decrypted data is falsified. The second falsification check data generated is collated with the first falsification check data. When the result of the collation is that the two falsification check data items agree with each other, it is determined that the data as an object for transfer is not falsified. On the other hand, when the two falsification check data items are different from each other., it is determined that the data as an object for transfer can be falsified in the data transfer process. When the mobile communication terminal of the data receiver is configured in this way to determine whether the data is falsified, the user of the mobile communication terminal can readily recognize the validity of the transferred data. For example, where there is a possibility that the data is falsified, use of the data (including reproduction thereof) is prohibited, so as to avoid inconveniences due to use of the falsified data (authentication failure, virus infection, etc.).

The information processing technology according to the present invention can extensively be carried out when a recording medium which a computer (including the mobile communication terminal) can read and which stores the aforementioned data processing program, is subjected to sale or distribution as a single unit or as an attached product.

Another potential mobile communication terminal according to the present invention is a mobile communication terminal comprising: data encrypting means for encrypting data, using a first encryption key; third falsification check data generating means for generating third falsification check data for a falsification check on the first encryption key; additional information encrypting means for encrypting additional information containing the third falsification check data generated by the third falsification check data generating means, using a second encryption key; and encryption file generating means for generating an encryption file of the data from the data encrypted by the data encrypting means, the additional information encrypted by the additional information encrypting means, and second encryption key information containing user-specific information permitting identification of a user of the mobile communication terminal.

Another potential information processing method according to the present invention is an information processing method for a mobile communication terminal to process data, the information processing method comprising: a data encryption step of encrypting data, using a first encryption key; a third falsification check data generation step of generating third falsification check data for a falsification check on the first encryption key; an additional information encryption step of encrypting additional information containing the third falsification check data generated in the third falsification check data generation step, using a second encryption key; and an encryption file generation step of generating an encryption file of the data from the data encrypted in the data encryption step, the additional information encrypted in the additional information encryption step, and second encryption key information containing user-specific information permitting identification of a user of the mobile communication terminal.

Another potential data processing program according to the present invention is a data processing program for letting a computer fulfill: a data encrypting function of encrypting data, using a first encryption key; a third falsification check data generation function of generating third falsification check data for a falsification check on the first encryption key; an additional information encryption function of encrypting additional information containing the third falsification check data generated by the third falsification check data generation function, using a second encryption key; and an encryption file generation function of generating an encryption file of the data from the data encrypted by the data encryption function, the additional information encrypted by the additional information encryption function, and second encryption key information containing user-specific information permitting identification of a user of a mobile communication terminal.

According to these aspects of the invention, the encryption file of the data is generated from the data encrypted using the first encryption key, the additional information containing the third falsification check data for the falsification check on the first encryption key, and the user-specific information. Namely, the generated encryption file contains both the encrypted data and the first encryption key encrypted after having been converted for the falsification check, which makes the analysis of data difficult. This can prevent the irregularities such as the unauthorized access to or falsification of the data by a third party in advance. As a result, high confidentiality can be secured for the data. Since the generated encryption file contains the user-specific information permitting the identification of the user of the mobile communication terminal, it is feasible to lower the risk that the encryption file is decrypted by mobile communication terminals of other users.

In another potential configuration, the encryption file is generated from additional information containing falsification check data for a falsification check on the second encryption key, instead of the first encryption key.

BRIEF DESCRIPTION OF THE DRAWINGS

FIG. 7 is an illustration conceptually showing the flow of data encryption processing executed by the transmitter cell phone in the second embodiment.

BEST MODES FOR CARRYING OUT THE INVENTION

First Embodiment

The mobile communication terminal in the first embodiment of the present invention will be described below with reference to FIGS. 1 to 5.

Figure 1:
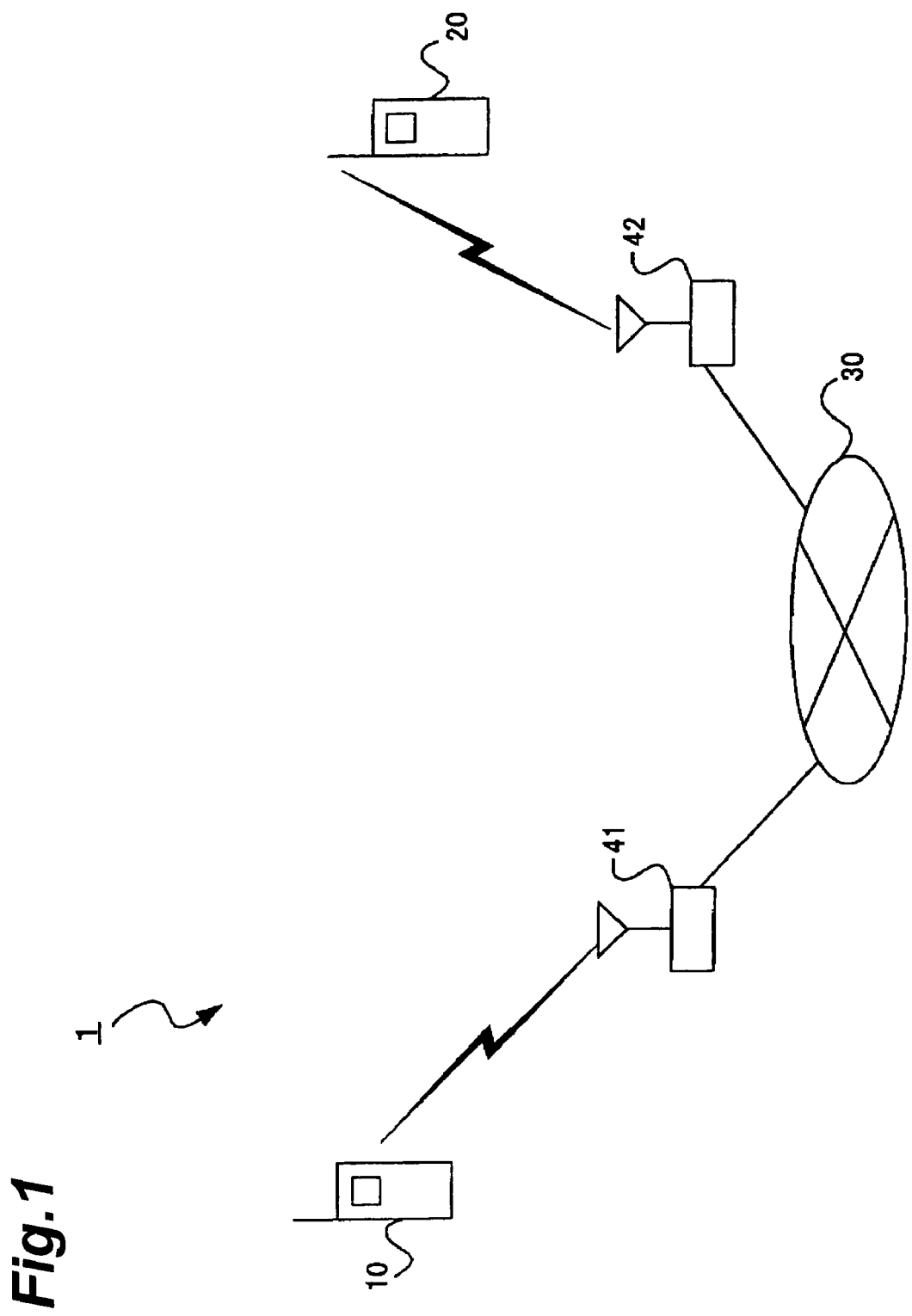
FIG. 1 is a schematic illustration showing a whole configuration of a data processing system.

First, the configuration will be described. FIG. 1 is a schematic illustration showing an example of the whole configuration of data processing system 1 in the present embodiment. As shown in FIG. 1, the data processing system 1 is generally comprised of transmitter cell phone 10 (corresponding to a mobile communication terminal) and receiver cell phone 20 (corresponding to a mobile communication terminal). The transmitter cell phone 10 is connected via base station 41 to mobile communication network 30 and the receiver cell phone 20 is connected via base station 42 to mobile communication network 30. The transmitter cell phone 10 and the receiver cell phone 20 are configured to be able to transmit or receive data to or from each other through mobile communication network 30. It is assumed in the description of the present embodiment hereinafter that one user uses the transmitter cell phone 10 and receiver cell phone 20, envisaging replacement of the UIM upon a switch between models of cell phones, or under such circumstances that the user selectively uses a plurality of communication terminals.

Figure 2:
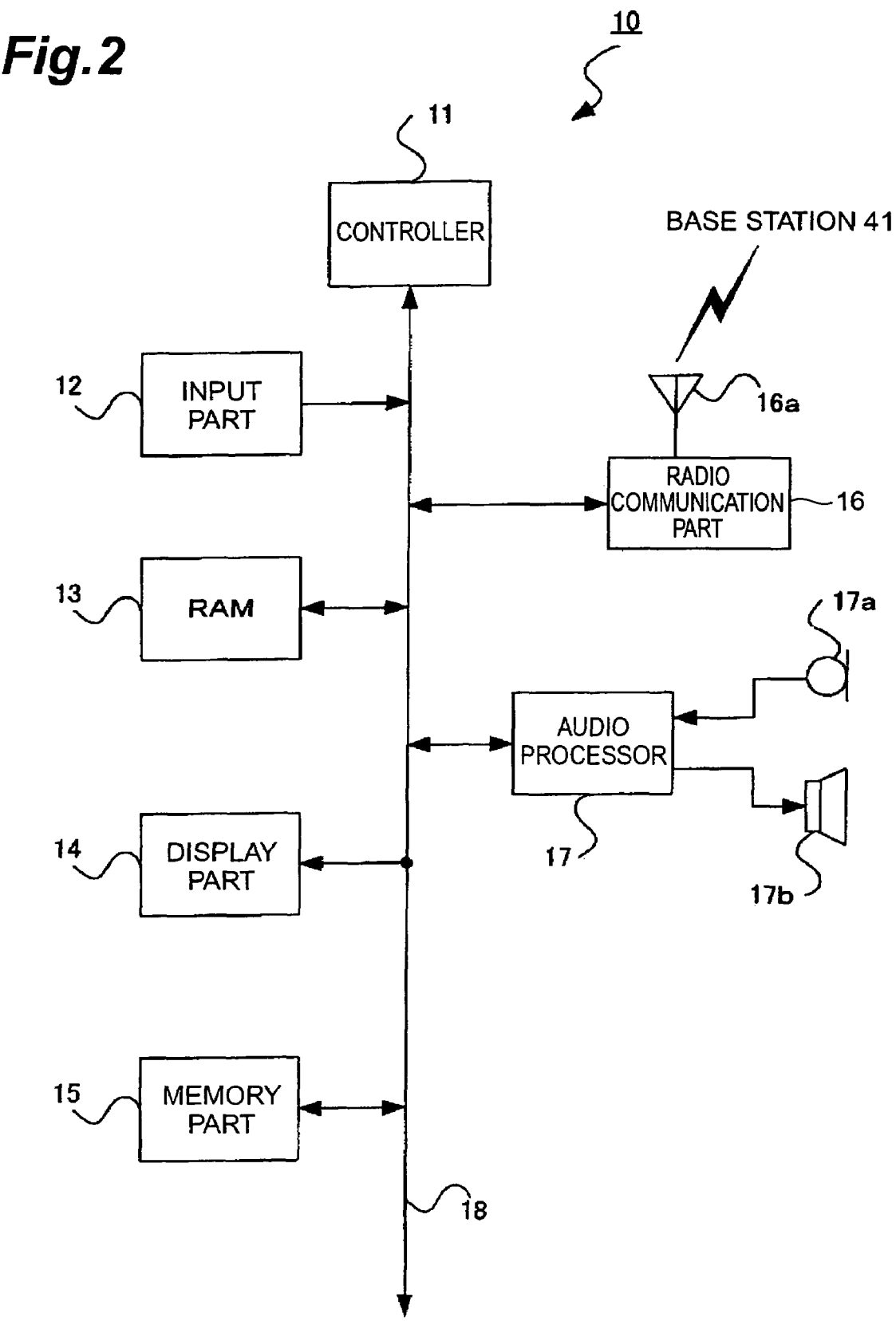
FIG. 2 is a block diagram showing a functional configuration of a transmitter cell phone.

The internal configuration of transmitter cell phone 10 will be detailed below with reference to FIG. 2. FIG. 2 is a block diagram showing the functional configuration of transmitter cell phone 10. As shown in FIG. 2, the transmitter cell phone 10 is composed of controller 11 (corresponding to the data encrypting means, first key encrypting means, encryption file generating means, first falsification check data generating means, additional information encrypting means, and second key generating means), input part 12, RAM 13, display part 14, memory part 15, radio communication part 16 with antenna 16a, and audio processor 17 with microphone 17a and speaker 17b, and these parts are connected through bus 18 so as to be able to implement input/output of various signals.

The controller 11 retrieves a program stored in the memory part 15, into RAM 13 and performs concentrated control over each part in accordance with the program. Namely, the controller 11 executes the encryption file generation processing including encryption of data as an object for transfer to the receiver cell phone 20 in accordance with an input signal from input part 12 and the program retrieved into the RAM 13, and temporarily saves the result of the processing into RAM 13. Then the controller stores the result of the processing saved in the RAM 13, into a predetermined area inside the memory part 15 as occasion may demand.

The input part 12 is constructed with various control buttons for giving instructions such as ON/OFF of power, selection of functions, etc., and these various control buttons are arranged to be depressed singly or in combination to output an input signal according to the contents of instructions to the controller 11.

The RAM (Random Access Memory) 13 is comprised of a volatile semiconductor memory and is arranged to temporarily save a program or data retrieved from memory part 15 described below, in various processes executed by the controller 11. The RAM 13 also has the function of VRAM (Video RAM) for temporarily saving data under display in the display part 14.

The display part 14 is comprised of an LCD (Liquid Crystal Display), an EL (Electro Luminescence), or the like, and is arranged to display displayed data on a screen in accordance with a display signal supplied from the controller 11.

The memory part 15 is comprised of a nonvolatile semiconductor memory such as an EEPROM (Electrically Erasable and Programmable ROM) or the like, and is arranged to store data necessary for execution of various processes, data generated as a result of execution of the various processes, and so on.

Figure 3:
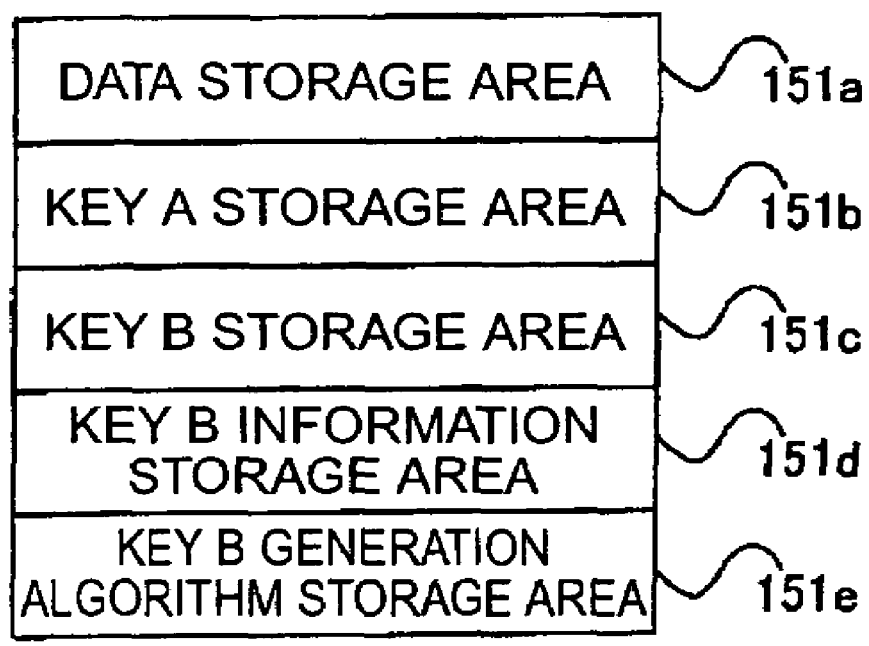
FIG. 3 is a diagram showing an internal configuration of memory part of the transmitter cell phone in the first embodiment.

As shown in FIG. 3, the memory part 15 internally has data storage area 151a, key A storage area 151b, key B storage area 151c, key B information storage area 151d, and key B generation algorithm storage area 151e. The data storage area 151a stores data as an object for transfer to the receiver cell phone 20, i.e., data to be encrypted. The data embraces a file and/or a program and is, for example, user information (a name and/or a telephone number of the user), a telephone directory, ringing melodies, and so on. The data may be a data group stored in a folder.

The key A storage area 151b stores an encryption key (corresponding to the first encryption key) for encryption of data retrieved from data storage area 151a, as "key A." The key A may be one that was stored in the key A storage area 151b, prior to an instruction of encryption of data, or one that is generated in conjunction with an encryption start instruction from the controller 11. The key A can be arbitrarily changed in its setting according to the level of copyright protection and the intensity of encryption for the data to be encrypted.

The key B storage area 151c stores another encryption key (corresponding to the second encryption key) for encryption of the key A retrieved from key A storage area 151b, as "key B." Data corresponding to user-specific information included in key B information described later can be used as it is (without any change or processing), as key B. For example, where the key B information contains the "telephone number" being one of the user-specific information, numerical data of "09012345678" will be stored in the key B storage area 151c.

Data newly generated in conjunction with an encryption start instruction from controller 11 may also be used as key B. Namely, data generated by properly changing or processing the data corresponding to the user-specific information included in the after-described key B information is used as key B. More specifically, where the key B information contains the "telephone number" being one of the user-specific information, the key B will be defined, for example, by numerical data of "09012345678090123456780901234567809012345678" being a series of repetitions of "09012345678." Therefore, this data is stored in the key B storage area 151c.

For this reason, the key B stored by either of the above methods comes to reflect the user-specific information. The key B can be arbitrarily changed in its setting according to the level of copyright protection and the intensity of encryption for the data to be encrypted.

The key B information storage area 151d stores "key B information" containing at least one user-specific information. The user-specific information is information for indicating what is the substance of the data (key B) as an object for acquisition or the data necessary for generation of key B, and is not such data itself. For example, where the user-specific information is the telephone number, such data will be numerical data of "09012345678" indicated by the user-specific information of "telephone number." The user-specific information is information permitting identification of the user of transmitter cell phone 10. The user-specific information is preferably information that cannot be rewritten even by the user of transmitter cell phone 10 and is, for example, the telephone number of transmitter cell phone 10, a user ID, a production number of transmitter cell phone 10, an ID of the UIM detachably mounted on transmitter cell phone 10, or the like.

The key B generation algorithm storage area 151e stores a key B generation algorithm. The key B generation algorithm is an algorithm for generation of key B, which is used only in the case where the key B is newly generated using the data corresponding to the aforementioned user-specific information. In the case where there exist a plurality of user-specific information items in the key B information, the key B generation algorithm selects some user-specific information items out of the plurality of user-specific information items and uses data corresponding to the selected user-specific information items in the generation of key B.

The radio communication part 16 performs control on radio communication with base station 41. Specifically, the radio communication part 16 is a circuit having a modulator-demodulator part (not shown) for carrying out modulation and demodulation of signals, and a coder-decoder (not shown) for performing coding and decoding of signals, and is provided with antenna 16a. The antenna 16a is telescopically arranged in the upper part of the housing of transmitter cell phone 10 and is used in transmission/reception of radio waves to or from base station 41.

The audio processor 17 is comprised of a converter, an amplifier, etc. and is provided with microphone 17a and speaker 17b. The audio processor 17 converts audio data supplied from controller 11, into an analog signal in the converter (not shown) and emits sound through amplification in the amplifier (not shown) from speaker 17b during calls. The audio processor 17 also converts an audio signal supplied through microphone 17a, into a digital signal by the converter and outputs the digital signal to controller 11 during calls.

The above described each of the components of transmitter cell phone 10 in the present embodiment, and the major configuration of receiver cell phone 20 is the same as the configuration of transmitter cell phone 10; therefore, the illustration and detailed description of the configuration is omitted herein. Namely, the receiver cell phone 20 is generally comprised of controller 21 (corresponding to the acquiring means, first key decrypting means, data decrypting means, data acquiring means, second key generating means, additional information decrypting means, first encryption key information acquiring means, first key generating means, second falsification check data generating means, and collating means), input part 22, RAM 23, display part 24, memory part 25, radio communication part 26 with antenna 26a, and audio processor 27 with microphone 27a and speaker 27b. The parts each are connected through bus 28 so as to be able to implement input/output of various signals.

The operation of transmitter cell phone 10 in the present embodiment will be described below, together with the information processing method according to the present invention. Each of steps described below is fulfilled by letting controller 11 execute the program stored in the memory part 15 shown in FIG. 2. The operation will be described on the premise that "X×Y" indicates data obtained by encrypting "X" using "Y." For example, "data×key A" indicates data obtained by encrypting data using key A.

Figure 4:
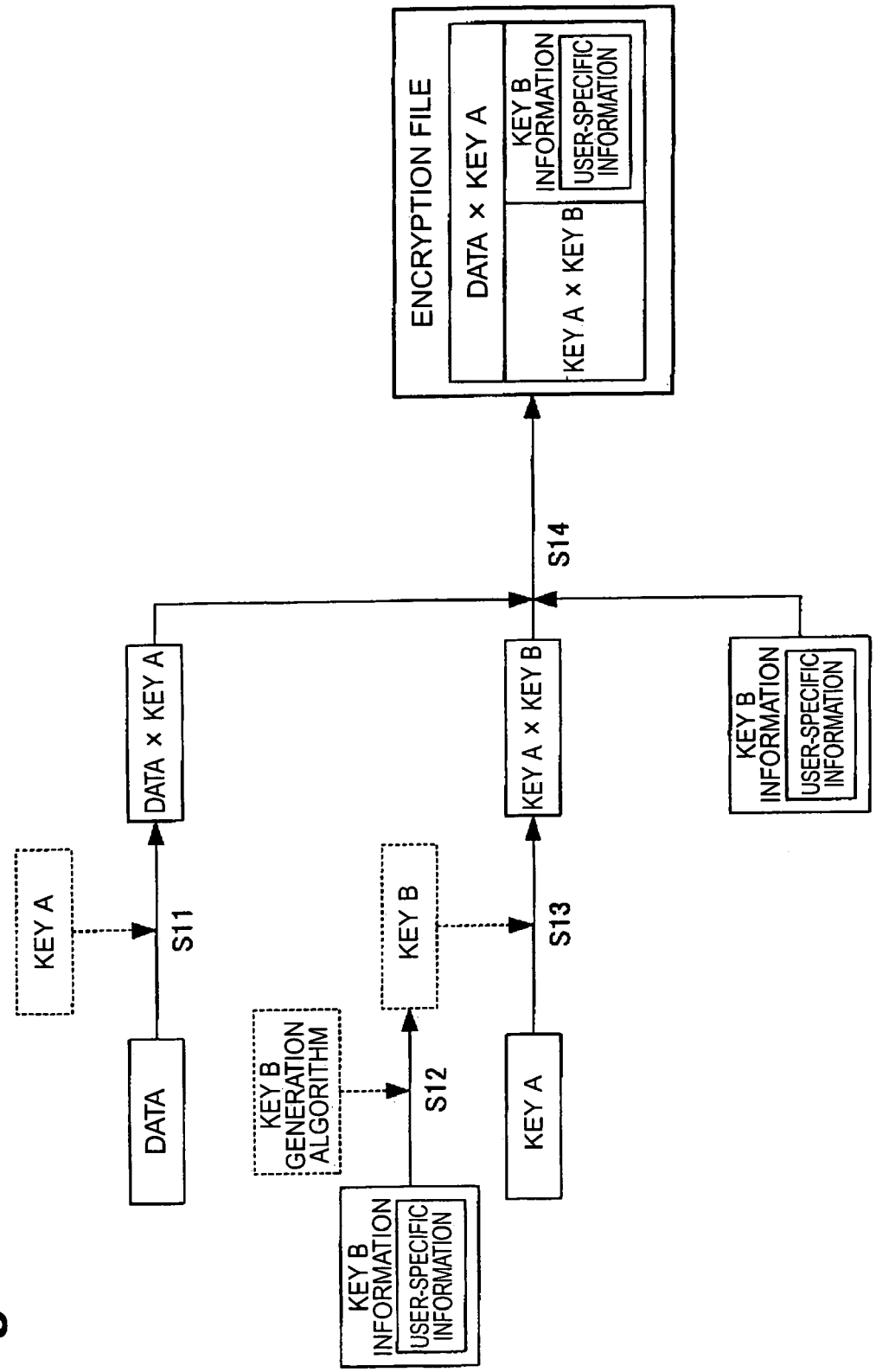
FIG. 4 is an illustration conceptually showing the flow of data encryption processing executed by the transmitter cell phone in the first embodiment.

FIG. 4 is an illustration conceptually showing the flow of the data encryption processing executed by transmitter cell phone 10. First, the controller 11 acquires data as an object for encryption from the data storage area 151a. Then the controller 11 encrypts the data, using the key A acquired from the key A storage area 151b (S11). As a result, "data×key A" is generated.

At S12, the controller 11 acquires or generates the key B. In the case where the controller 11 acquires the key B, the controller 11 acquires the data corresponding to the user-specific information in the key B information from the predetermined area of memory part 15. Thereafter, the above data itself is stored as key B into the key B storage area 151c. For example, where the user-specific information is the telephone number of the transmitter cell phone 10, the data of "09012345678" will be stored into the key B storage area 151c.

In the case where the controller 11 generates the key B, the controller 11 first acquires the key B information from the key B information storage area 151d. Subsequently, it acquires the key B generation algorithm from the key B generation algorithm storage area 151e. The controller 11 executes the key B generation algorithm to generate the key B on the basis of the user-specific information included in the above key B information. The generated key B is stored into the key B storage area 151c. For example, where the user-specific information is the telephone number of transmitter cell phone 10, data of a series of the predetermined number of repetitions of "09012345678" will be stored into the key B storage area 151c. Upon the storage or after the storage, this key B may be arbitrarily changed according to the level of copyright protection and the intensity of encryption for the data to be encrypted.

Furthermore, the controller 11 encrypts the key A, using the key B acquired from the key B storage area 151c (S13). As a result, "key A×key B" is generated.

Then the controller 11 acquires the key B information from key B information storage area 151d and combines the data of "data×key A," "key A×key B," and key B information (S14). The term "combine" herein means to generate one or more files from a plurality of data items. As a result, an encryption file is generated. The transmitter cell phone 10 transfers the generated encryption file to the receiver cell phone 20. The transfer of the encryption file can be implemented by any transfer method; for example, transmission via a server apparatus, transfer through a recording medium such as the UIM or the like, transfer using short-range radio communication such as IrDA (Infrared Data Association) or Bluetooth (registered trademark), and so on.

In the transmitter cell phone 10 of the present embodiment, the encryption file is generated from the data encrypted using the key A (data×key A), the key A encrypted using the key B (key A×key B), and the key B information. Namely, the encryption file is generated through double encryption processes, so that the analysis of the data becomes more difficult than that of encryption files generated through encryption using a non-encrypted encryption key. This prevents the irregularities such as the unauthorized access to or falsification of the data by a third party in advance. As a result, high confidentiality can be secured for the data. Since the generated encryption file contains the user-specific information permitting identification of the user of the transmitter cell phone 10, the encryption file is at low risk of being decrypted by other users.

Figure 5:
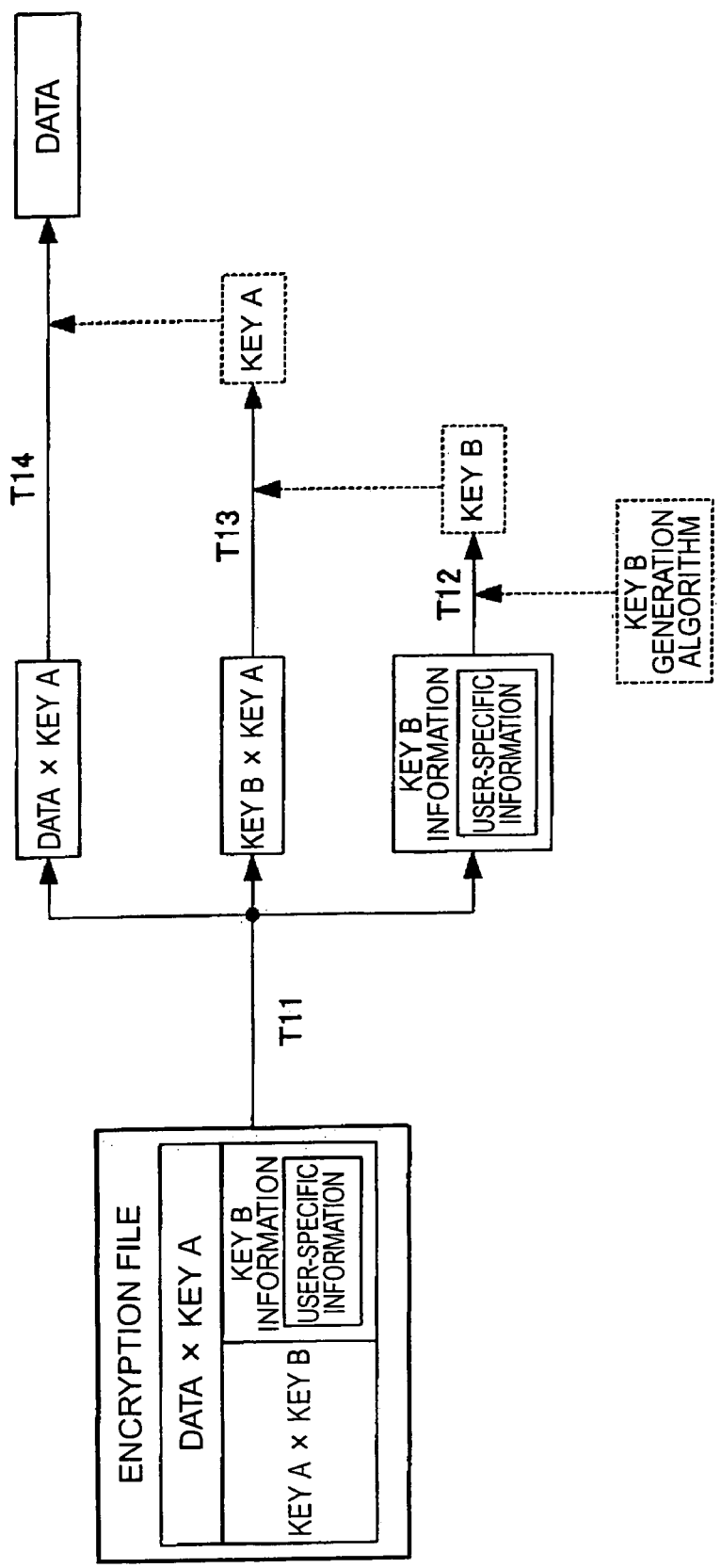
FIG. 5 is an illustration conceptually showing the flow of data decryption processing executed by a receiver cell phone in the first embodiment.

The following is the description of the operation of receiver cell phone 20 in the present embodiment. Each of steps described below is fulfilled by letting the controller 21 execute the program stored in the memory part 25. FIG. 5 is an illustration conceptually showing the flow of the data decryption processing executed by the receiver cell phone 20. First, the receiver cell phone 20 acquires the encryption file from transmitter cell phone 10. Subsequently, the controller 21 separates the acquired encryption file into the data of "data× key A," "key A×key B," and key B information (T11). The term "separate" herein means to generate a plurality of data items from one or more files.

Subsequently, the controller 21 acquires the key B generation algorithm from the key B generation algorithm storage area 151e. Then the controller 21 acquires or generates the key B by the aforementioned method on the basis of the user-specific information in the key B information acquired at T11, using the key B generation algorithm (T12). The controller 21 decrypts "key A×key B," using this key B (T13). As a consequence, the key A is generated. Then the controller 21 decrypts "data×key A," using the generated key A (T14). As a result, the data, which was stored in the data storage area 151a, is restored.

The receiver cell phone 20 of the present embodiment is configured to decrypt the encryption file of the data generated from the data encrypted using the key A, the key A encrypted using the key B, and the key B information. The encryption file is one encrypted so as to make the analysis of the data difficult, in order to prevent the irregularities such as the unauthorized access to or falsification of the data by a third party. Accordingly, the transfer of data can be implemented with high confidentiality from the transmitter cell phone 10 to the receiver cell phone 20.

Second Embodiment

The mobile communication terminal in the second embodiment of the present invention will be described below with reference to FIGS. 6 and 7. Since the fundamental configuration of the data processing system in the present embodiment is much the same as that of the data processing system 1 in the first embodiment, the same reference symbols will denote the corresponding components, without description thereof, and only differences from the first embodiment will be detailed below.

The second embodiment is based on a form of generating the key B by changing or processing the data corresponding to the user-specific information. The transmitter cell phone 10 in the second embodiment is different from the transmitter cell phone in the first embodiment in that a plurality of key B generation algorithms are stored in the key B generation algorithm storage area 151e shown in FIG. 3 and in that a key B generation algorithm is properly selected and used out of those key B generation algorithms.

Figure 6:
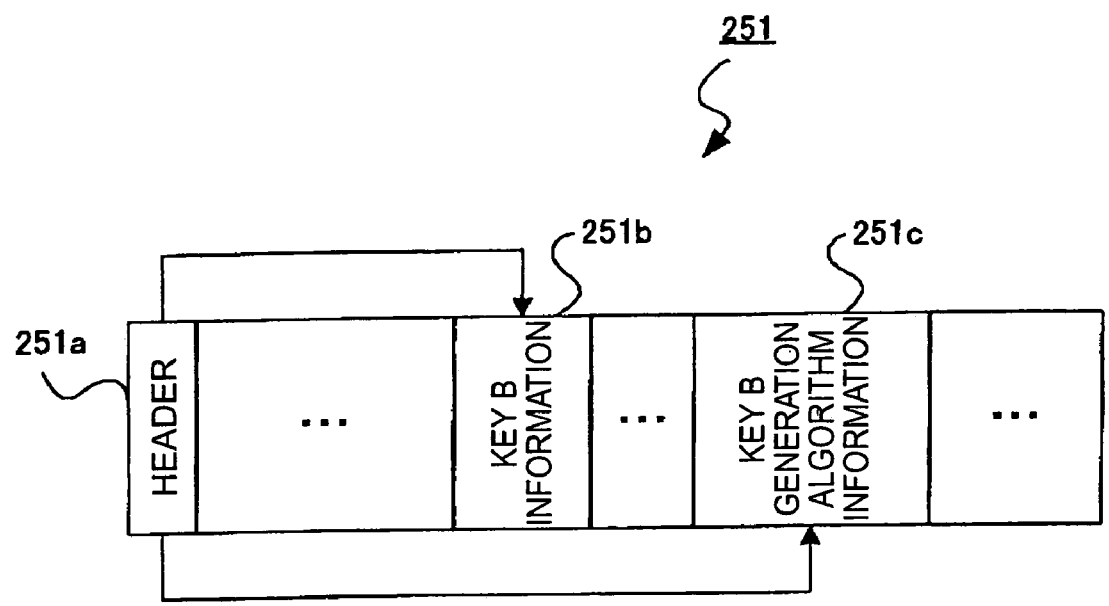
FIG. 6 is a diagram showing a configuration example of key B related information in the second embodiment.

FIG. 6 is a diagram showing a configuration example of key B related information 251 stored in the key B information storage area 151d (cf. FIG. 3). As shown in FIG. 6, the key B related information 251 is configured containing at least header 251a, key B information 251b, and key B generation algorithm information 251c.

The header 251a stores information indicating locations of storage of the key B information 251b and the key B generation algorithm information 251c. Namely, the controller 11 extracts the key B information 251b and the key B generation algorithm information 251c from the key B related information 251 with reference to the header 251a.

The key B information 251b stores "key B information" necessary for generation of the key B (corresponding to the second encryption key). This key B information (corresponding to the second encryption key information) contains at least one user-specific information permitting identification of the user of transmitter cell phone 10. The user-specific information is, for example, the telephone number of transmitter cell phone 10, the user ID, the production number of transmitter cell phone 10, the ID of the UIM, or the like.

The key B generation algorithm information 251c stores information for identification of a predetermined key B generation algorithm (corresponding to the identification information) among the plurality of key B generation algorithms stored in the key B generation algorithm storage area 151e. Namely, the controller 11 selects an algorithm used in generation of the key B, out of the plurality of key B generation algorithms, based on this key B generation algorithm information.

Furthermore, dummy data not used for encryption is put in areas (areas indicated by " . . . " in the figure) except for the header 251a, key B information 251b, and key B generation algorithm information 251c. This makes it difficult to extract the key B information 251b and key B generation algorithm information 251c, without reference to the header 251a, and thus enhances the confidentiality of the key B related information. The locations of storage of the key B information 251b and key B generation algorithm information 251c can be those arbitrarily changeable, or those fixed.

The key B generation algorithm storage area 15le stores a plurality of key B generation algorithms as detailed in the first embodiment.

The following is the description of the operation of transmitter cell phone 10 in the present embodiment, together with the information processing method according to the present invention. FIG. 7 is a diagram conceptually showing the flow of the data encryption processing executed by the transmitter cell phone 10. The operation of transmitter cell phone 10 in the present embodiment is different in the process of S12.

At S12, the controller 11 acquires the key B related information 251 from the key B information storage area 151d. Subsequently, the controller 11 acquires the key B information 251b and the key B generation algorithm information 251c with reference to the header 251a included in the acquired key B related information 251. Furthermore, the controller 11 selects and acquires the key B generation algorithm identified by the key B generation algorithm information 251c, out of the plurality of key B generation algorithms stored in the key B generation algorithm storage area 151e. Then the controller 11 generates the key B from the data corresponding to the user-specific information in the key B information acquired from the key B information storage area 151d, using the key B generation algorithm acquired from the key B generation algorithm storage area 151e.

In the transmitter cell phone 10 of the present embodiment, the key B is generated using the algorithm identified by the key B generation algorithm information. Accordingly, the algorithm used is changed according to the key B generation algorithm information. This can further enhance the confidentiality for the data while making it more difficult for a third party to specify the used algorithm than in the case where the key B is always generated using the same algorithm.

Third Embodiment

The data processing system in the third embodiment of the present invention will be described below with reference to FIGS. 8 to 11. Since the fundamental configuration of the data processing system in the present embodiment is much the same as that of the data processing system 1 in the first embodiment, the same reference symbols will denote the corresponding components, without description thereof, and only differences from the first embodiment will be detailed below. The data processing system 1 in the present embodiment is different in the internal configurations of memory part 15 of transmitter cell phone 10 and memory part 25 of receiver cell phone 20 from the data processing system 1 in the first embodiment.

Figure 8A:
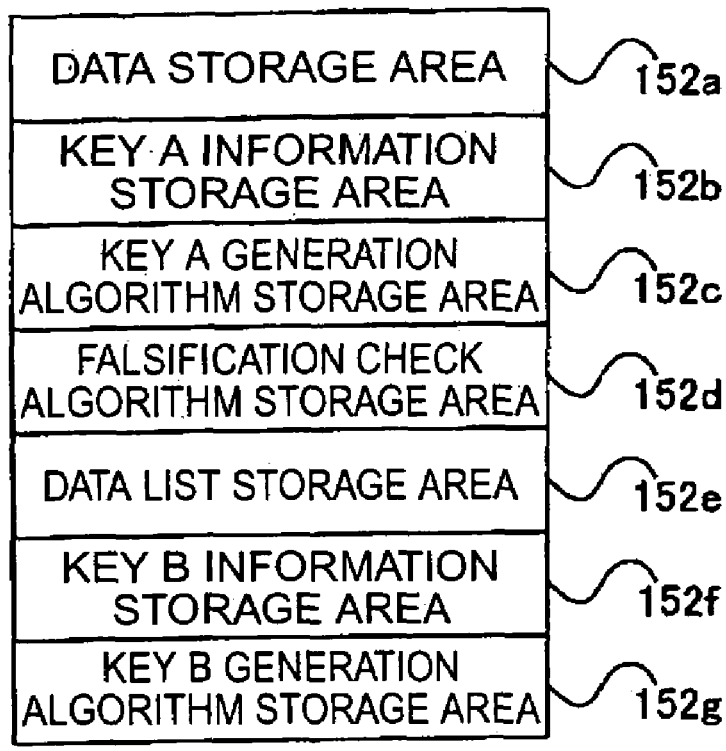
FIG. 8A is a diagram showing an internal configuration of the memory part of the transmitter cell phone in the third embodiment.

Namely, as shown in FIG. 8A, the memory part 15 internally has data storage area 152a, key A information storage area 152b, key A generation algorithm storage area 152c, falsification check algorithm storage area 152d, data list storage area 152e, key B information storage area 152f, and key B generation algorithm storage area 152g.

The data storage area 152a stores data as an object for transfer to receiver cell phone 20, i.e., data as an object for encryption. The data embraces a file and/or a program and is, for example, the user information (the name and/or the telephone number of the user), the telephone directory, the ringing melodies, or the like. The data may be a data group stored in a folder.

The key A information storage area 152b stores "key A information" necessary for generation of the key A (corresponding to the first encryption key). This key A information (corresponding to the first encryption key information) can be any information, for example, such as the telephone number of transmitter cell phone 10, the user ID, the production number of transmitter cell phone 10, a time, a random number, or the like, but it is desirable to use information different from after-described key B information in view of the difficulty in the analysis of data.

The key A generation algorithm storage area 152c stores "key A generation algorithm" which is an algorithm for generation of the key A, using the key A information.

The falsification check algorithm storage area 152d stores a falsification check algorithm which is an algorithm for generation of falsification check data 1 (corresponding to the first falsification check data) from the data retrieved from data storage area 152a. The falsification check algorithm is, for example, a hash function and, more specifically, is one of MD (Message Digest) 2, MD4, MD5, SHA (Secure Hash Algorithm)-1, and so on.

In the case where the data is stored in a folder, the data list storage area 152e stores as "data list" a list of information (a name, an identification number, etc.) for identification of the data stored in the folder.

The key B information storage area 152f stores the "key B information" necessary for generation of the key B (corresponding to the second encryption key). This key B information (corresponding to the second encryption key information) contains at least one user-specific information permitting identification of the user of the transmitter cell phone 10. The user-specific information is information that cannot be rewritten even by the user of the transmitter cell phone 10 and is, for example, the telephone number of transmitter cell phone 10, the user ID, the production number of transmitter cell phone 10, the ID of the UIM, or the like.

The key B generation algorithm storage area 152g stores the "key B generation algorithm" which is an algorithm for generation of the key B using the key B information.

Figure 8B:
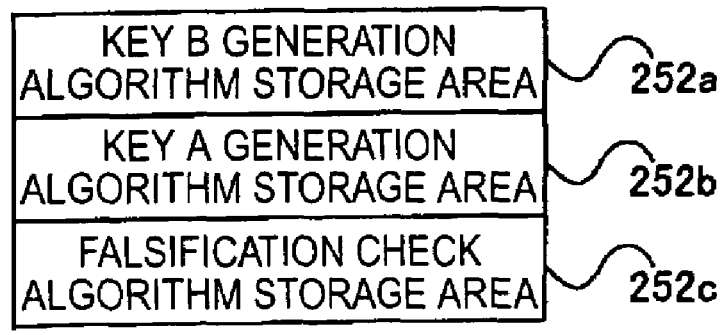
FIG. 8B is a diagram showing an internal configuration of the memory part of the receiver cell phone in the third embodiment.

As shown in FIG. 8B, the memory part 25 internally has key B generation algorithm storage area 252a, key A generation algorithm storage area 252b, and falsification check algorithm storage area 252c.

The key B generation algorithm storage area 252a stores the "key B generation algorithm" which is an algorithm for generation of the key B using the key B information.

The key A generation algorithm storage area 252b stores the "key A generation algorithm" which is an algorithm for generation of the key A using the key A information.

The falsification check algorithm storage area 252c stores the falsification check algorithm which is an algorithm for generation of falsification check data 2 (corresponding to the second falsification check data) from decrypted data. The falsification check algorithm is, for example, a hash function and, more specifically, it is one of MD (Message Digest) 2, MD4, MD5, SHA (Secure Hash Algorithm)-1, and so on.

The operation of transmitter cell phone 10 in the present embodiment will be described below, together with the information processing method according to the present invention. Each of steps described below is fulfilled by letting the controller 11 execute the program stored in the memory part 15 shown in FIG. 2.

Figure 9:
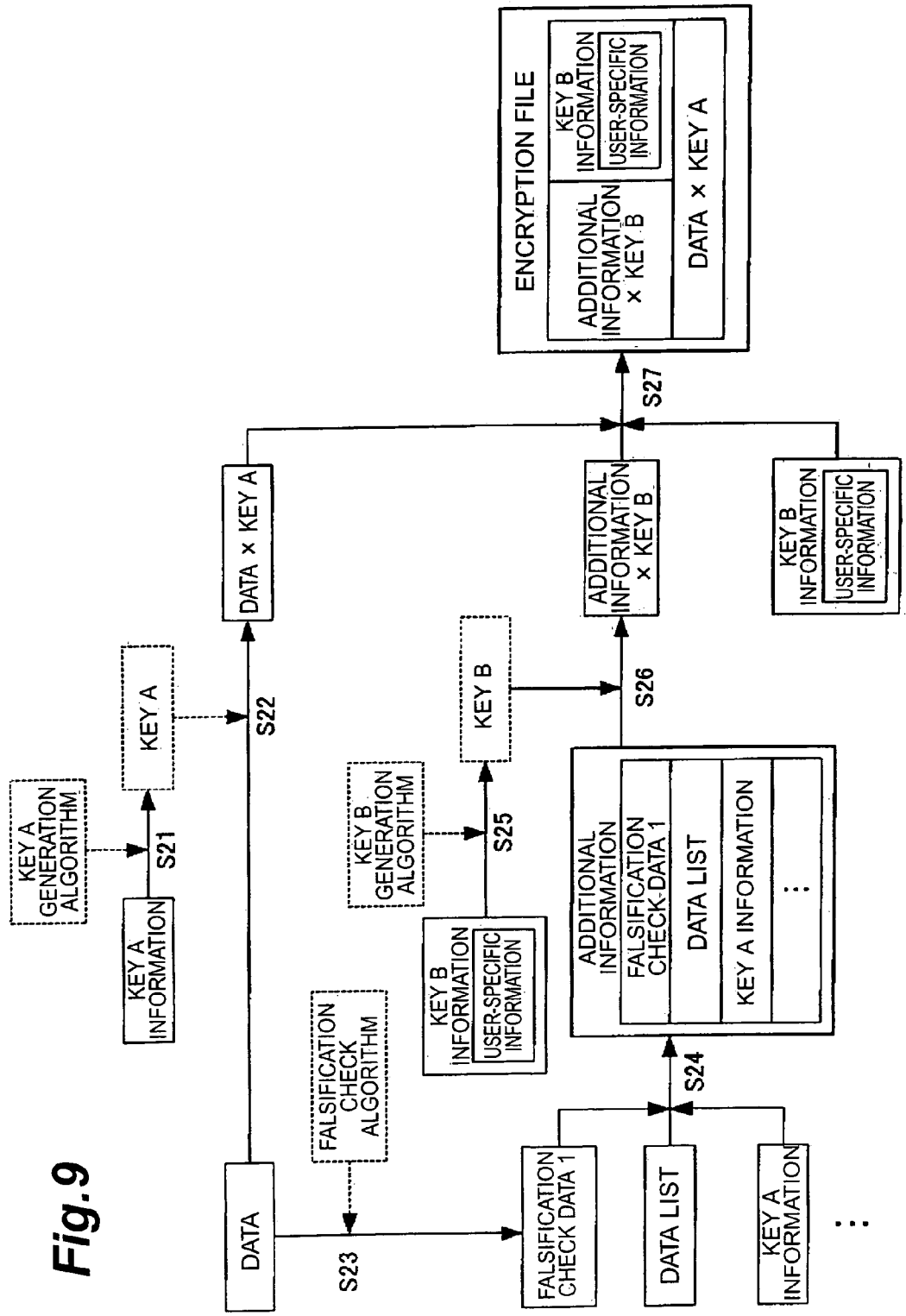
FIG. 9 is an illustration conceptually showing the flow of data encryption processing executed by the transmitter cell phone in the third embodiment.

FIG. 9 is a diagram conceptually showing the flow of the data encryption processing executed by the transmitter cell phone 10. First, the controller 11 acquires the key A information from the key A information storage area 152b. The controller 11 also acquires the key A generation algorithm from the key A generation algorithm storage area 152c. Then the controller 11 generates the key A from the key A information acquired from the key A information storage area 152b, using the key A generation algorithm acquired from the key A generation algorithm storage area 152c (S21). Upon the generation or after the generation, this key A may be arbitrarily changed according to the level of copyright protection and the intensity of encryption for the data to be encrypted.

Subsequently, the controller 11 acquires data as an object for encryption from the data storage area 152a. Then the controller 11 encrypts the data, using the key A generated at S21 (S22). As a result, "data×key A" is generated.

On the other hand, the controller 11 acquires the falsification check algorithm from the falsification check algorithm storage area 152d and generates the falsification check data 1 from the data acquired from the data storage area 152a, using the falsification check algorithm (S23). For example, where the falsification check algorithm is a hash function, the falsification check data 1 will correspond to the hash value.

The controller 11 combines the data items of falsification check data 1 generated at S23, the data list acquired from the data list storage area 152e, and the key A information acquired from the key A information storage area 152b (S24). The term "combine" herein means to generate one or more files from a plurality of data items. This results in generating additional information containing the falsification check data 1, the data list, and the key A information.

Subsequently, the controller 11 acquires the key B information from key B information storage area 152f. The controller 11 also acquires the key B generation algorithm from the key B generation algorithm storage area 152g. Then the controller 11 generates the key B from the key B information acquired from the key B information storage area 152f, using the key B generation algorithm acquired from the key B generation algorithm storage area 152g (S25). Upon the generation or after the generation, this key B may be arbitrarily changed according to the level of copyright protection and the intensity of encryption for the data to be encrypted.

Then the controller 11 encrypts the additional information generated at S24, using the key B generated at S25 (S26). As a result, "additional information×key B" is generated.

Thereafter, the controller 11 acquires the key B information from the key B information storage area 152f and combines the data items of "data×key A," "additional information×key B," and key B information (S27). As a result, an encryption file is generated. The transmitter cell phone 10 transfers the generated encryption file to receiver cell phone 20. The transfer of the encryption file can be implemented by any transfer method; for example, transmission via a server apparatus, transfer through a recording medium such as the UIM or the like, short-range radio communication such as IrDA (Infrared Data Association) or Bluetooth (registered trademark), and so on.

The controller 11 may be configured at S26 to extract the data list from the additional information and encrypt only the additional information except for the data list. In this case, the data list is attached in a non-encrypted state to the additional information and thereafter is incorporated into the encryption file. This decreases the load on the transmitter cell phone 10 due to the data encryption processing. It also decreases the volume of data of the encryption file and thus saves the free space of memory part 15.

In the transmitter cell phone 10 of the present embodiment, the encryption file is generated from the data encrypted using the key A, the additional information containing the falsification check data 1 for the falsification check on the data, and the key B information. Namely, the generated encryption file contains both the encrypted data and the data encrypted after having been converted for the falsification check, which makes the analysis of data difficult. As a result, higher confidentiality is secured for the data. Since the generated encryption file contains the key B information containing the information permitting identification of the user of the transmitter cell phone 10, it is at low risk of being decrypted by other users.

In the transmitter cell phone 10 of the present embodiment, the key B is generated using the key B information containing the information permitting identification of the user of the transmitter cell phone 10. The additional information containing the falsification check data 1 is encrypted using the key B. Namely, the information permitting the identification of the user is essential to decryption of the additional information. Accordingly, the encryption file is at low risk of being decrypted by other users, as a matter of course, and the additional information is also at low risk of being decrypted by other users. This permits much higher confidentiality to be secured for the data.

Figure 10:
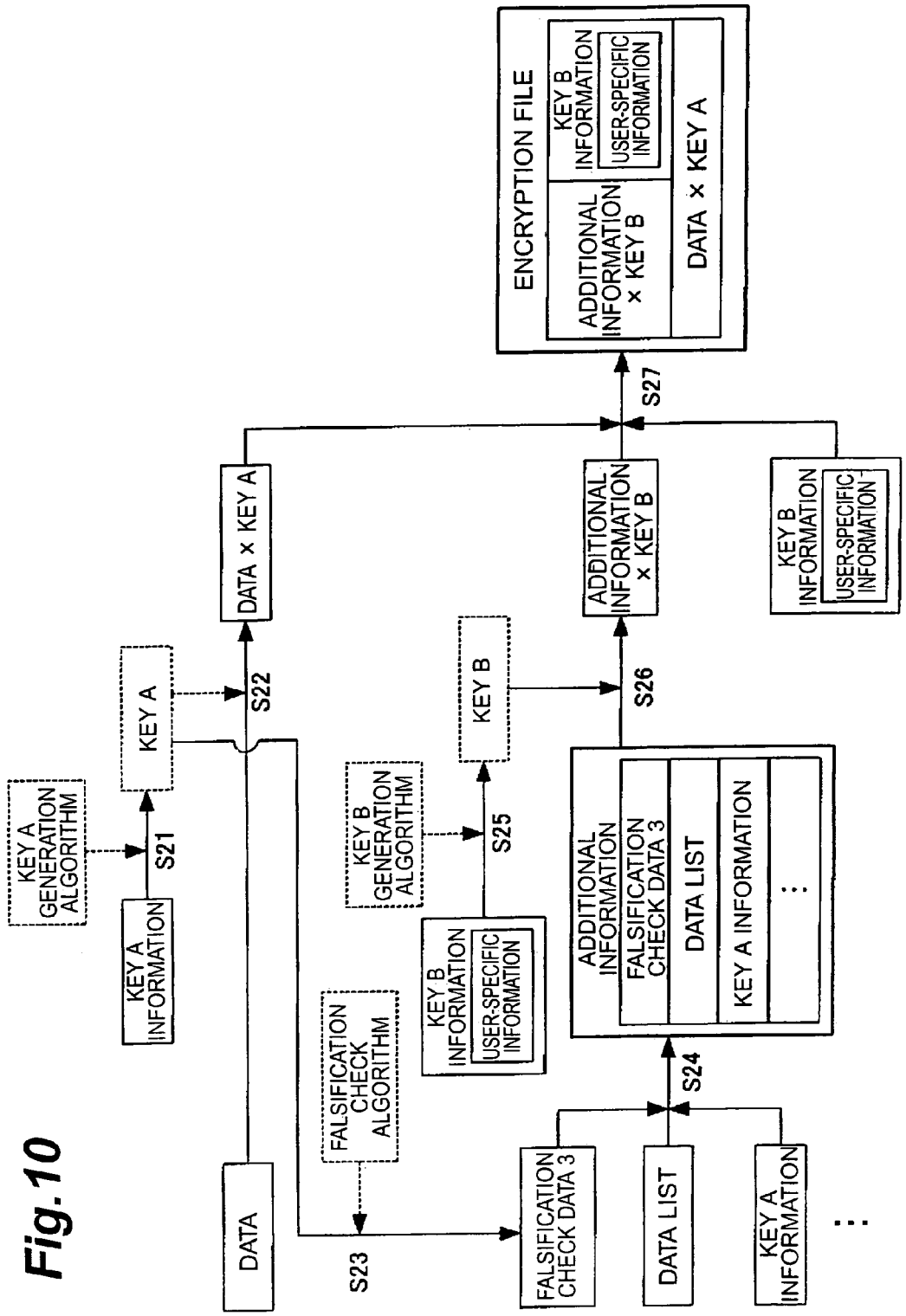
FIG. 10 is an illustration conceptually showing the flow of data encryption processing executed by the transmitter cell phone in a modification of the third embodiment.

Here FIG. 10 is a diagram conceptually showing the flow of data encryption processing in a modification of the third embodiment. In the third embodiment, the target for the falsification check by the falsification check algorithm was the data as an object for encryption. However, as shown in FIG. 10, the key A generated at S21 can be used as a target for the falsification check, or the key B generated at S25 can be used as a target for the falsification check. This results in generating falsification check data 3 (corresponding to the third falsification check data) through conversion of key A or key B for the falsification check.

The key A or key B is normally lower in volume than the aforementioned data, and thus makes the falsification check easier. Accordingly, the processing load due to the falsification check is reduced on the transmitter cell phone 10. Since the falsification check data generated from the key A or the key B of the lower volume than the above data also has a lower volume, it can save the free space of memory part 15. This form is suitably applicable particularly to cases not requiring a so high security level for data transfer.

Figure 11:
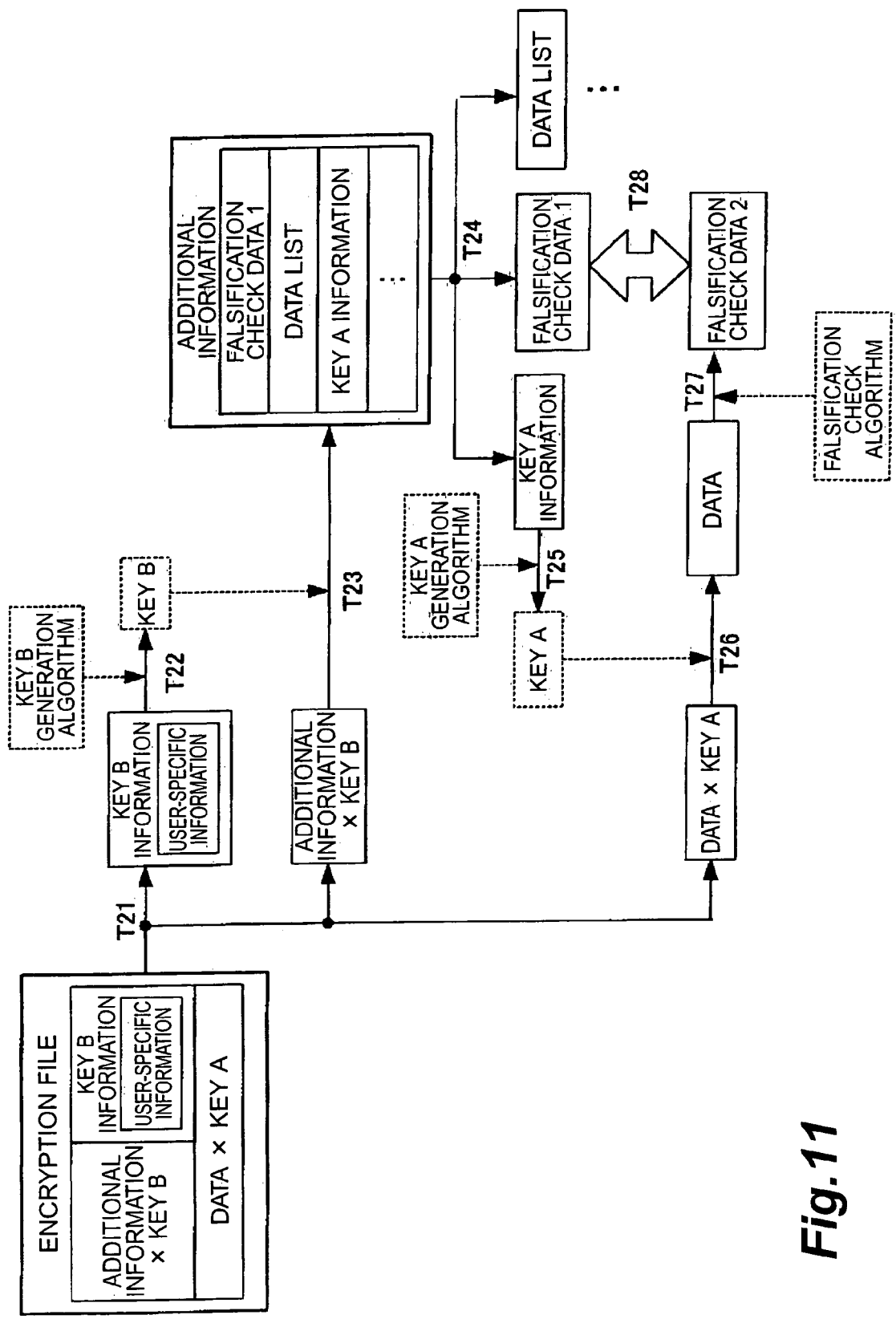
FIG. 11 is an illustration conceptually showing the flow of data decryption processing executed by the receiver cell phone in the third embodiment.

The following is the description of the operation of receiver cell phone 20 in the present embodiment. Each of steps described below is fulfilled by letting the controller 21 execute the program stored in the memory part 25. FIG. 11 is a diagram conceptually showing the flow of the data decryption processing executed by receiver cell phone 20. First, the receiver cell phone 20 acquires the encryption file from the transmitter cell phone 10. Subsequently, the controller 21 separates the acquired encryption file into the data items of key B information, "additional information×key B," and "data×key A" to acquire them (T21).

Thereafter, the controller 21 acquires the key B generation algorithm from the key B generation algorithm storage area 252a. Then the controller 21 generates the key B from the key B information acquired at T21, using the key B generation algorithm acquired from the key B generation algorithm storage area 252a (T22).

Then the controller 21 decrypts "additional information×key B" acquired at T21, using the key B generated at T22 (T23). As a result, the additional information, which was encrypted at S26 in FIG. 9, is restored. The controller 21 separates the additional information into the data items of the falsification check data 1, the data list, and the key A information to acquire them (T24).

The controller 21 acquires the key A generation algorithm from the key A generation algorithm storage area 252b. Then the controller 21 generates the key A from the key A information acquired at T24, using the key A generation algorithm acquired from the key A generation algorithm storage area 252b (T25).

Then the controller 21 decrypts "data×key A" acquired at T26, using the key A generated at T25 (T26). As a result, the data encrypted by transmitter cell phone 10 is restored.

The receiver cell phone 20 in the present embodiment decrypts the encryption file of the data generated from the data encrypted using the key A, the additional information encrypted using the key B, and the key B information containing the user-specific information. The encryption file is one encrypted so as to make the analysis of data much more difficult, in order to prevent the irregularities such as the unauthorized access to or falsification of the data by a third party. Accordingly, the data transfer can be implemented with much higher confidentiality from the transmitter cell phone 10 to the receiver cell phone 20.

Furthermore, the receiver cell phone 20 in the present embodiment performs the processing described below, for judging the identity between decrypted data and encrypted data. Namely, the controller 21 acquires the falsification check algorithm from the falsification check algorithm storage area 252c. The controller 21 generates falsification check data 2 from the data decrypted at T26, using the acquired falsification check algorithm (T27). For example, where the falsification check algorithm is a hash function, the falsification check data 2 will correspond to the hash value.

Finally, the controller 21 compares and collates the falsification check data 1 acquired from the additional information at T24, with the falsification check data 2 generated at T27 to determine the identity of the falsification check data. When the result of the comparison collation is that the two falsification check data items agree with each other, the controller 21 determines that no falsification is made on the data as an object for transfer. On the other hand, when the two falsification check data items disagree, the controller 21 determines that there is a possibility that the data as an object for transfer is falsified during the data transfer process.

When the receiver cell phone 20 is configured to determine the presence or absence of falsification on the data in this way, the user of the receiver cell phone 20 is allowed to readily recognize the validity of transferred data. For example, if there is a possibility that the data is falsified, use of the data (including reproduction thereof) will be prohibited, so as to circumvent the inconveniences (authentication failure, virus infection, etc.) due to use of the falsified data.

Fourth Embodiment

The fourth embodiment of the present invention will be described below with reference to FIGS. 12 to 14. Since the configuration of the data processing system in the present embodiment is much the same as the configuration of data processing system 1 in the third embodiment, the same reference symbols will denote the corresponding components, without description thereof, and only differences from the third embodiment will be detailed below. The data processing system 1 of the present embodiment is different in the internal configuration of memory part 15 in the transmitter cell phone 10 from the data processing system 1 of the third embodiment.

Figure 12A:
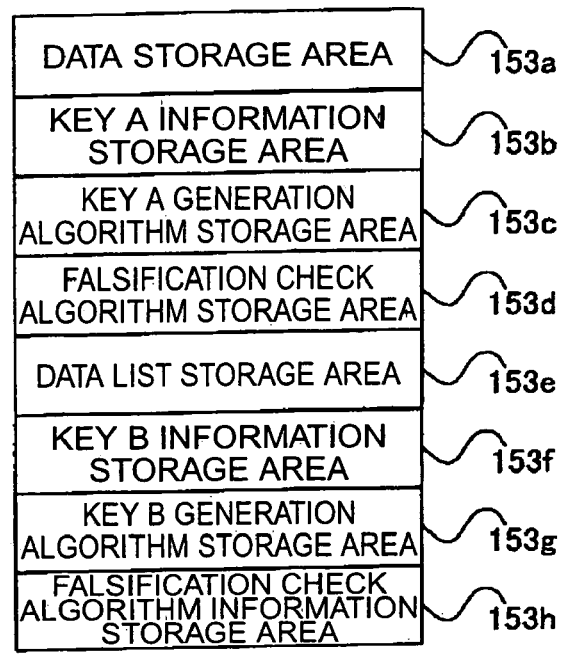
FIG. 12A is a diagram showing an internal configuration of the memory part of the transmitter cell phone in the fourth embodiment.
Figure 13:
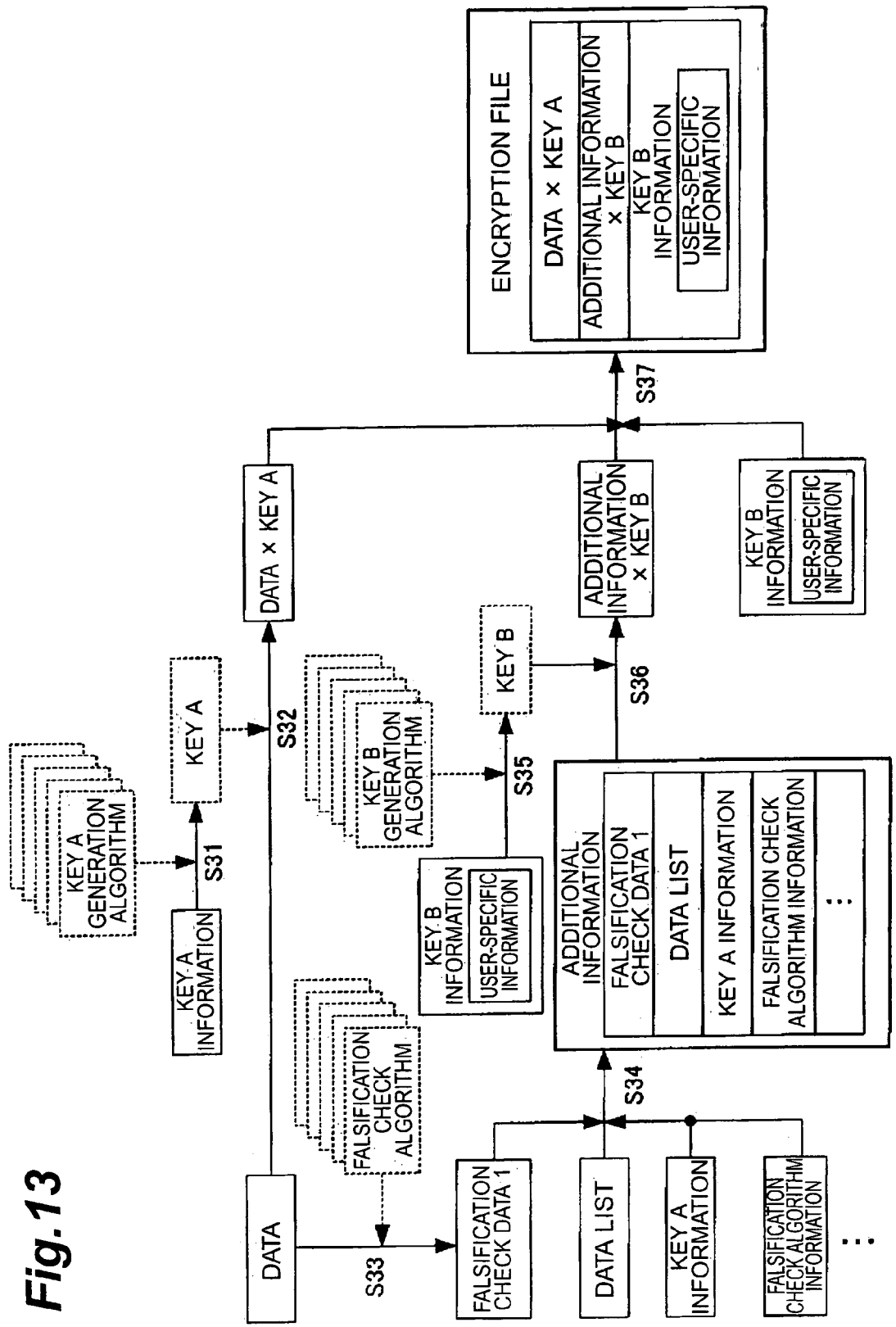
FIG. 13 is an illustration conceptually showing the flow of data encryption processing executed by the transmitter cell phone in the fourth embodiment.

Namely, as shown in FIG. 12A, the memory part 15 internally has data storage area 153a, key A information storage area 153b, key A generation algorithm storage area 153c, falsification check algorithm storage area 153d, data list storage area 153e, key B information storage area 153f, key B generation algorithm storage area 153g, and falsification check algorithm information storage area 153h.

The present embodiment will be described as to the falsification check algorithm information storage area 153h, which is the structural difference from the memory part 15 in the third embodiment. The falsification check algorithm information storage area 153h stores information for identification of falsification check algorithms. Namely, the falsification check algorithm storage area 153d stores a plurality of falsification check algorithms, and the controller 11 selects an algorithm to be used in a falsification check, based on the falsification check algorithm information, out of the plurality of falsification check algorithms.

Figure 12B:
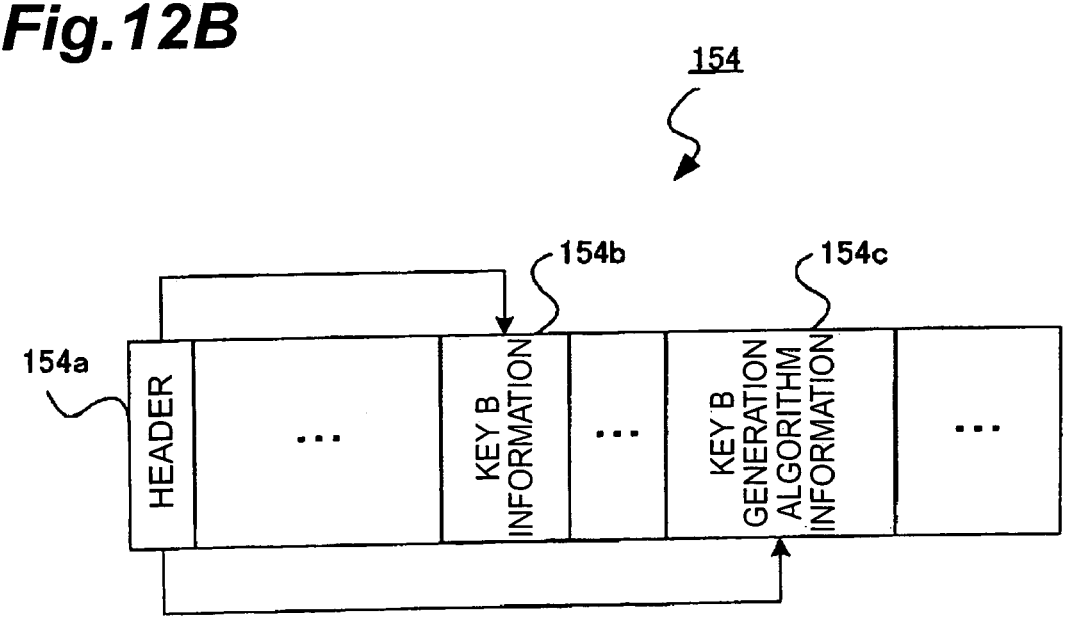
FIG. 12B is a diagram showing a configuration example of key B related information in the fourth embodiment.

FIG. 12B is a diagram showing a configuration example of key B related information 154 stored in the key B information storage area 153f. As shown in FIG. 12B, the key B related information 154 is constructed containing at least header 154a, key B information 154b, and key B generation algorithm information 154c.

The header 154a stores information indicating locations of storage of the key B information 154b and the key B generation algorithm information 154c. Namely, the controller 11 extracts the key B information 154b and the key B generation algorithm information 154c from the key B related information 154 with reference to the header 154a.

The key B information 154b stores "key B information" necessary for generation of key B (corresponding to the second encryption key information). This key B information (corresponding to the second encryption key information) contains at least one user-specific information permitting identification of the user of transmitter cell phone 10. The user-specific information is, for example, the telephone number of transmitter cell phone 10, the user ID, the production number of transmitter cell phone 10, the ID of the UIM, or the like.

The key B generation algorithm information 154c stores information (corresponding to the identification information) for identification of the predetermined key B generation algorithm among the plurality of key B generation algorithms stored in the key B generation algorithm storage area 153g. Namely, the controller 11 selects an algorithm used in generation of key B out of the plurality of key B generation algorithms, based on the key B generation algorithm information.

Furthermore, dummy data not used in encryption is put in the areas other than the header 154a, key B information 154b, and key B generation algorithm information 154c (i.e., in the areas indicated by "..." in the figure). This makes it difficult to extract the key B information 154b and the key B generation algorithm information 154c, without reference to header 154a, and thus enhances the confidentiality of the key B related information. The storage locations of the key B information 154b and key B generation algorithm information 154c may be those arbitrarily changeable, or those fixed.

The above described the configuration of key B related information 154 stored in the key B information storage area 153f, and in the present embodiment the key A related information of a configuration similar to that of the key B related information 154 is also stored in the key A information storage area 153b.

The operation of transmitter cell phone 10 in the present embodiment will be described below. FIG. 13 is a diagram conceptually showing the flow of the data encryption processing executed by the transmitter cell phone 10. The operation of transmitter cell phone 10 in the present embodiment is much the same in the major part as that of the transmitter cell phone 10 detailed in the third embodiment. Namely, S31-S37 shown in FIG. 13 correspond to S21-S27 shown in FIG. 9. The following is the description of S31, S33, S34, and S35 which are processes different from those in the third embodiment.

At S31, the controller 11 first acquires the key A related information from the key A information storage area 153b. Subsequently, the controller 11 acquires the key A information and key A generation algorithm information with reference to the header included in the acquired key A related information. Furthermore, the controller 11 selects and acquires the key A generation algorithm identified by the key A generation algorithm information, out of the plurality of key A generation algorithms stored in the key A generation algorithm storage area 153c, based on the key A generation algorithm information. Then the controller 11 generates the key A from the key A information acquired from the key A information storage area 153b, using the key A generation algorithm acquired from the key A generation algorithm storage area 153c.

At S33, the controller 11 acquires the falsification check algorithm information from the falsification check algorithm information storage area 153h. Subsequently, the controller 11 selects and acquires the falsification check algorithm identified by the falsification check algorithm information, out of the plurality of falsification check algorithms stored in the falsification check algorithm storage area 153d, based on the acquired falsification check algorithm information. Then the controller 11 generates falsification check data from the data acquired from the data storage area 153a, using the acquired falsification check algorithm.

At S34, the controller 11 combines the data items of the falsification check data 1 generated at S33, the data list acquired from the data list storage area 153e, the key A information acquired from the key A information storage area 153b, and the falsification check algorithm information acquired at S33. This results in generating additional information containing the falsification check data 1, the data list, the key A information, and the falsification check algorithm information.

Furthermore, at S35, the controller performs a process similar to S31 about the key B related information. Namely, the controller 11 acquires the key B related information from the key B information storage area 153f. Subsequently, the controller 11 acquires the key B information and the key B generation algorithm information with reference to the header included in the acquired key B related information. Furthermore, the controller 11 selects and acquires the key B generation algorithm identified by the key B generation algorithm information, out of the plurality of key B generation algorithms stored in the key B generation algorithm storage area 153g, based on the key B generation algorithm information. Then the controller 11 generates the key B from the key B information acquired from the key B information storage area 153f, using the key B generation algorithm acquired from the key B generation algorithm storage area 153g.

S36 may be configured so that the controller 11 extracts the data list from the additional information and encrypts only the additional information except for the data list. In this case, the data list is attached in a non-encrypted state to the additional information and thereafter incorporated into the encryption file. This reduces the load on the transmitter cell phone 10 due to the data encryption processing. It also decreases the data volume of the encryption file and thus saves the free space of memory part 15.

In the transmitter cell phone 10 of the present embodiment, the key A is generated using the algorithm identified by the identification information included in the key A information. Similarly, the key B is generated using the algorithm identified by the identification information included in the key B information. The data is converted into the falsification check data, using the algorithm identified by the falsification check algorithm information. Accordingly, the used algorithms are changed according to the types of the key A information, key B information, and falsification check algorithm information. This makes it more difficult for a third party to specify the used algorithms, and further enhances the confidentiality for the data, as compared with the case where the key A, key B, and falsification check data are always generated using the same algorithms.

Figure 14:
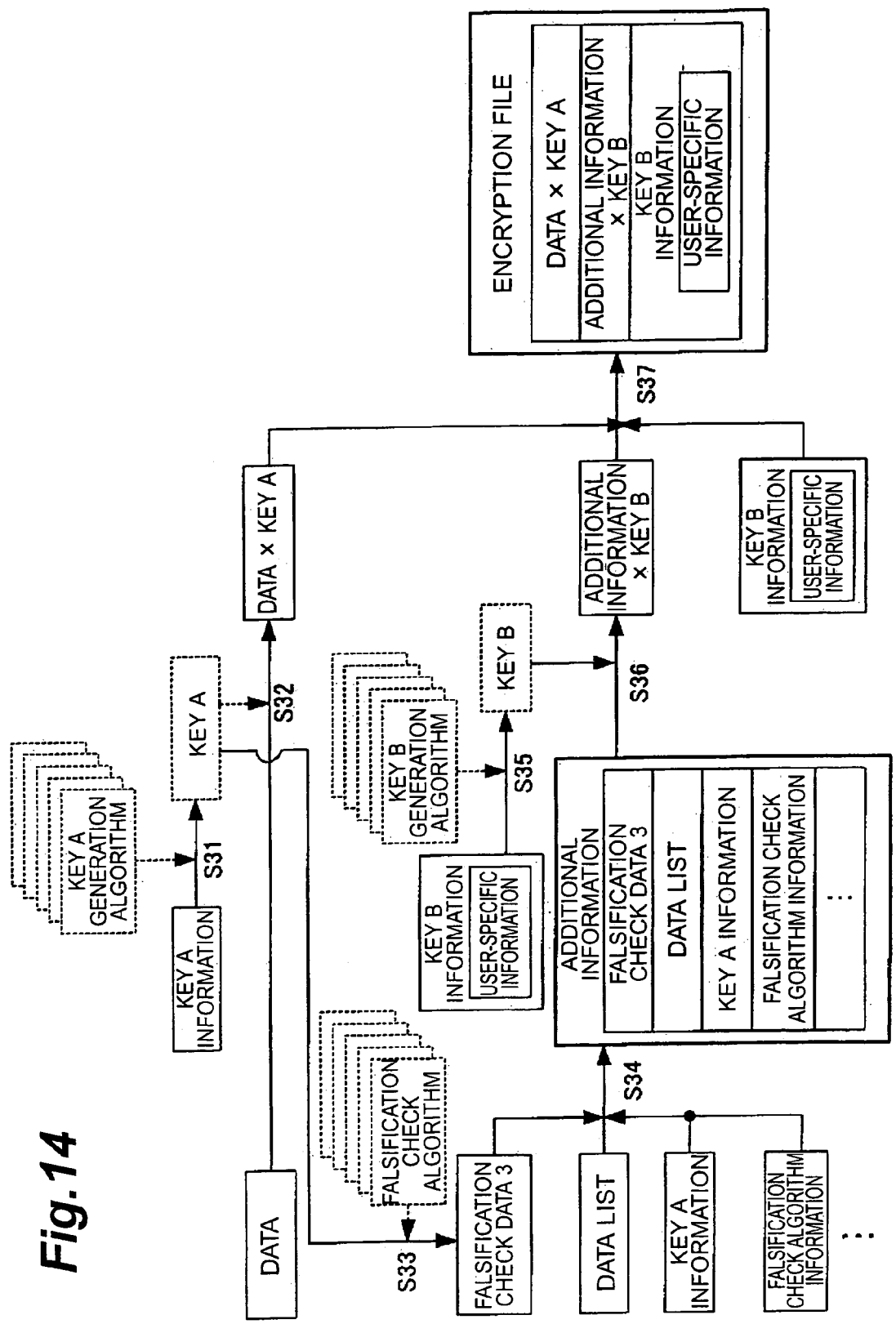
FIG. 14 is an illustration conceptually showing the flow of data encryption processing executed by the transmitter cell phone in a modification of the fourth embodiment.

Here FIG. 14 is a diagram conceptually showing the flow of data encryption processing in a modification of the fourth embodiment. In the fourth embodiment the target for the falsification check by the selected falsification check algorithm was the data as an object for encryption. However, as shown in FIG. 14, the key A generated at S31 may be defined as a target for the falsification check, or the key B generated at S35 may be defined as a target for the falsification check. This results in generating falsification check data 3 through conversion of the key A or the key B for the falsification check.

The key A or the key B is normally lower in volume than the above data and thus makes the falsification check easier. Accordingly, this configuration decreases the processing load on the transmitter cell phone 10 due to the falsification check. Since the volume is low of the falsification check data generated from the key A or the key B with the lower volume than the above data, the free space of memory part 15 can be saved. This configuration is suitably applicable particularly to cases not requiring a so high security level during transfer of data.

The forms described in the above embodiments are just preferred examples of the data processing system according to the present invention, and it is noted that the present invention is by no means intended to be limited to these forms. For example, it was described in each of the above embodiments that the encryption key and the decryption key were the same key (private key cryptography), but they may be different keys (public key cryptography).

Lastly, the below will describe a data processing program according to the present invention, and a computer-readable recording medium (hereinafter simply referred to as "recording medium") containing a record of the program. Here the recording medium is a medium that can induce states of change of energy such as magnetism, light, electricity, or the like in accordance with the description contents of the data processing program against a reading device provided as a hardware resource in a general-purpose computer or the like and that can transmit the description contents of the data processing program in the format of signals corresponding to the change states to the reading device. Such recording media include, for example, media detachably mounted on computers (including cell phones, PHSs, etc.) like IC cards such as the UIM or the like, magnetic disks, optical disks, and magnetooptical disks, and also include HDs (Hard Disks) fixedly incorporated in the computers, nonvolatile semiconductor memories of firmware or the like integrally secured, and so on.

The data processing program according to the present invention may be configured so that part or all thereof is transmitted through a transmission medium such as a communication line or the like from another device to be received and recorded by the radio communication part 16 or the radio communication part 26. Conversely, the data processing program according to the present invention may also be configured to be transmitted through the transmission medium and be installed in another device.

INDUSTRIAL APPLICABILITY

In the mobile communication terminal, information processing method, data processing program, and recording medium according to the present invention, the encryption file of data is generated from the data encrypted using the first encryption key, the first encryption key encrypted using the second encryption key, and the user-specific information. Namely, the encryption file is generated through the double encryption processes and this makes the analysis of the data more difficult than that of encryption files encrypted using a non-encrypted encryption key. This can prevent the irregularities such as the unauthorized access to or falsification of the data by a third party in advance. As a result, high confidentiality can be secured for the data. Since the generated encryption file contains the user-specific information permitting identification of the user of the mobile communication terminal, the encryption file is at low risk of being decrypted by mobile communication terminals of other users.

The invention claimed is:

1. A mobile communication terminal having a user associated therewith comprising:
   a controller;
   a data encrypting unit configured to encrypt data using a first encryption key;

a second key generating unit configured to generate a second encryption key using a pre-determined algorithm and user-specific information permitting identification of the user associated with the mobile communication terminal;

a first falsification check data generating unit configured to generate first falsification check data used for a falsification check on the data;

an additional information encrypting unit configured to encrypt, using the second encryption key, additional information containing the generated first falsification check data;

an encryption file generating unit configured to generate an encryption file comprising the encrypted data, the encrypted additional information, and the user-specific information permitting identification of the user associated with the mobile communication terminal used to generate the second encryption key;

a transferring unit configured to transfer the generated encryption file including the encrypted data, the encrypted additional information, and the user-specific information to a receiver mobile communication terminal storing the pre-determined algorithm;

a data acquiring unit configured to acquire the encrypted data, the encrypted additional information, and a second encryption key information from the encryption file;

a second key generating unit configured to generate the second encryption key using the acquired second encryption key information;

an additional information decrypting unit configured to decrypt the additional information using the generated second encryption key;

a first encryption key information acquiring unit configured to acquire a first encryption key information and the first falsification check data from the decrypted additional information;

a first key generating unit configured to generate the first encryption key using the acquired first encryption key information; and a data decrypting unit configured to decrypt the acquired encrypted data using the generated first encryption key, wherein the receiver mobile communication terminal is able to decrypt the encrypted data by using the encrypted additional information, the user-specific information and the pre-determined algorithm, wherein an encryption key information contains identification information for identification of an algorithm used in generation of the second encryption key, wherein the second key generating unit is further configured to generate the second encryption key using the algorithm identified by the identification information, and wherein the additional information contains a data list and first encryption key information necessary for generation of the first encryption key.

2. The mobile communication terminal according to claim 1, further comprising:

a second falsification check data generating unit configured to encrypt second falsification check data used for a falsification check on the decrypted data; and a collating unit configured to collate the acquired first falsification check data, with the generated second falsification check data.

3. An information processing method for a mobile communication terminal having a user associated therewith to process data, said information processing method comprising:

encrypting data using a first encryption key;

generating second encryption key using a pre-determined algorithm and user-specific information permitting identification of the user associated with the mobile communication terminal;

generating first falsification check data used for a falsification check on the data;

encrypting additional information containing the first falsification check data generated in the first falsification check data generation step, using the second encryption key;

generating an encryption file comprising the encrypted data, the encrypted additional information, and the user-specific information permitting identification of the user associated with the mobile communication terminal used to generate the second encryption key;

transferring the generated encryption file including the encrypted data, the encrypted additional information, and the user-specific information to a receiver mobile communication terminal storing the pre-determined algorithm;

decrypting, at the receiver mobile communication terminal, the encrypted data using the encrypted additional information, the user-specific information and the pre-determined algorithm;

acquiring the encrypted data, the encrypted additional information, and a second encryption key information from the encryption file;

generating the second encryption key using the acquired second encryption key information;

decrypting the additional information using the generated second encryption key;

acquiring a first encryption key information and the first falsification check data from the decrypted additional information;

generating the first encryption key using the first encryption key information acquired in the prior acquiring step; and a data decryption step of decrypting the acquired encrypted data using the generated first encryption key, wherein an encryption key information contains identification information for identification of an algorithm used in generating the second encryption key, wherein the generating second encryption key further generates the second encryption key using the algorithm identified by the identification information, and wherein the additional information contains a data list and first encryption key information necessary for generating the first encryption key.

4. A computer readable storage medium including a data processing program for executing a method for a mobile communication terminal having a user associated therewith to process data, the method comprising:

encrypting data using a first encryption key;

generating second encryption key using a pre-determined algorithm and user-specific information permitting identification of the user associated with the mobile communication terminal;

generating first falsification check data used for a falsification check on the data;

encrypting additional information containing the first falsification check data generated in the first falsification check data generation step, using the second encryption key;

generating an encryption file comprising the encrypted data, the encrypted additional information, and the user-specific information permitting identification of the user associated with the mobile communication terminal used to generate the second encryption key;

transferring the generated encryption file including the encrypted data, the encrypted additional information, and the user-specific information to a receiver mobile communication terminal storing the pre-determined algorithm;

decrypting, at the receiver mobile communication terminal, the encrypted data using the encrypted additional information, the user-specific information and the pre-determined algorithm;

acquiring the encrypted data, the encrypted additional information, and a second encryption key information from the encryption file;

generating the second encryption key using the acquired second encryption key information;

decrypting the additional information using the generated second encryption key;

acquiring a first encryption key information and the first falsification check data from the decrypted additional information;

generating the first encryption key using the acquired first encryption key information; and decrypting the acquired data using the generated first encryption key, wherein an encryption key information contains identification information for identification of an algorithm used in generating the second encryption key, wherein the generating second encryption key further generates the second encryption key using the algorithm identified by the identification information, and wherein the additional information contains a data list and first encryption key information necessary for generating the first encryption key.

* * * * *